United States Patent
Sapugay et al.

(10) Patent No.: US 11,720,756 B2
(45) Date of Patent: *Aug. 8, 2023

(54) DERIVING MULTIPLE MEANING REPRESENTATIONS FOR AN UTTERANCE IN A NATURAL LANGUAGE UNDERSTANDING (NLU) FRAMEWORK

(71) Applicant: ServiceNow, Inc., Santa Clara, CA (US)

(72) Inventors: Edwin Sapugay, Foster City, CA (US); Gopal Sarda, San Jose, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/451,405

(22) Filed: Oct. 19, 2021

(65) Prior Publication Data

US 2022/0036012 A1 Feb. 3, 2022

Related U.S. Application Data

(63) Continuation of application No. 16/552,493, filed on Aug. 27, 2019, now Pat. No. 11,205,052.

(Continued)

(51) Int. Cl.
*G06F 40/30* (2020.01)
*G06N 3/08* (2023.01)
(Continued)

(52) U.S. Cl.
CPC ............ *G06F 40/30* (2020.01); *G06F 40/205* (2020.01); *G06F 40/211* (2020.01);
(Continued)

(58) Field of Classification Search
CPC ...... G06F 40/30; G06F 40/211; G06F 40/284; G06F 40/216; G06F 40/205; G06F 40/20
See application file for complete search history.

(56) References Cited

U.S. PATENT DOCUMENTS

| 6,609,122 B1 | 8/2003 | Ensor |
| 6,678,887 B1 | 1/2004 | Hallman |
(Continued)

FOREIGN PATENT DOCUMENTS

| CN | 101866337 A | 10/2010 |
| CN | 107526834 A | 12/2017 |
(Continued)

OTHER PUBLICATIONS

U.S. Appl. No. 62/869,864, filed Jul. 2, 2019, Sapugay et al.

(Continued)

*Primary Examiner* — Samuel G Neway
(74) *Attorney, Agent, or Firm* — Fletcher Yoder PC

(57) ABSTRACT

The present approaches are generally related to an agent automation framework that is capable of extracting meaning from user utterances, such as requests received by a virtual agent (e.g., a chat agent), and suitably responding to these user utterances. In certain aspects, the agent automation framework includes a NLU framework and an intent-entity model having defined intents and entities that are associated with sample utterances. The NLU framework may include a meaning extraction subsystem designed to generate meaning representations for the sample utterances of the intent-entity model to construct an understanding model, as well as generate meaning representations for a received user utterance to construct an utterance meaning model. The disclosed NLU framework may include a meaning search subsystem that is designed to search the meaning representations of the understanding model to locate matches for meaning representations of the utterance meaning model.

20 Claims, 13 Drawing Sheets

Related U.S. Application Data

(60) Provisional application No. 62/869,826, filed on Jul. 2, 2019.

(51) Int. Cl.
    *G06F 40/205*    (2020.01)
    *G06F 40/253*    (2020.01)
    *G06F 40/295*    (2020.01)
    *G06F 40/211*    (2020.01)
    *G06F 40/284*    (2020.01)
    *G06F 40/216*    (2020.01)

(52) U.S. Cl.
    CPC .......... *G06F 40/216* (2020.01); *G06F 40/253* (2020.01); *G06F 40/284* (2020.01); *G06F 40/295* (2020.01); *G06N 3/08* (2013.01)

(56) References Cited

U.S. PATENT DOCUMENTS

| | | |
|---|---|---|
| 7,020,706 B2 | 3/2006 | Cates |
| 7,062,683 B2 | 6/2006 | Warpenburg |
| 7,131,037 B1 | 10/2006 | LeFaive |
| 7,170,864 B2 | 1/2007 | Matharu |
| 7,509,653 B2 | 3/2009 | Das et al. |
| 7,610,512 B2 | 10/2009 | Gerber |
| 7,617,073 B2 | 11/2009 | Trinon |
| 7,617,500 B2 | 11/2009 | Astl et al. |
| 7,630,784 B2 | 12/2009 | Hunt et al. |
| 7,653,650 B2 | 1/2010 | Kulkarni et al. |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,849,201 B1 | 12/2010 | Subbarao et al. |
| 7,890,802 B2 | 2/2011 | Gerber |
| 7,925,981 B2 | 4/2011 | Pourheidar |
| 7,930,396 B2 | 4/2011 | Trinon |
| 7,971,147 B2 | 4/2011 | Bhatkhande et al. |
| 7,945,860 B2 | 5/2011 | Vambenepe |
| 7,958,031 B2 | 6/2011 | Hunt et al. |
| 7,966,398 B2 | 6/2011 | Wiles |
| 8,006,240 B2 | 6/2011 | Subbarao et al. |
| 8,051,164 B2 | 11/2011 | Peuter |
| 8,112,354 B2 | 2/2012 | Lalwani et al. |
| 8,156,479 B2 | 4/2012 | Fong et al. |
| 8,224,683 B2 | 7/2012 | Manos |
| 8,266,096 B2 | 9/2012 | Navarrete |
| 8,402,127 B2 | 3/2013 | Solin |
| 8,433,654 B2 | 4/2013 | Subbarao et al. |
| 8,457,928 B2 | 6/2013 | Dang |
| 8,473,361 B2 | 6/2013 | Subbarao et al. |
| 8,478,569 B2 | 7/2013 | Scarpelli |
| 8,612,289 B2 | 12/2013 | Subbarao et al. |
| 8,612,408 B2 | 12/2013 | Trinon |
| 8,650,078 B2 | 2/2014 | Subbarao et al. |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Meuller |
| 8,887,133 B2 | 11/2014 | Behnia |
| 8,987,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,626,717 B2 | 4/2017 | Sapugay et al. |
| 9,633,004 B2 | 4/2017 | Giuli et al. |
| 9,645,833 B2 | 5/2017 | Meuller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,002,129 B1* | 6/2018 | D'Souza ............... G06F 40/289 |
| 10,095,686 B2* | 10/2018 | Zhang .................... G06Q 50/10 |
| 10,325,024 B2* | 6/2019 | Allen ...................... G06F 40/35 |
| 11,205,052 B2* | 12/2021 | Sapugay ............. G06F 16/3329 |
| 2006/0130038 A1 | 6/2006 | Claussen et al. |
| 2007/0261065 A1 | 11/2007 | Astl et al. |
| 2008/0075444 A1 | 3/2008 | Subbarao et al. |
| 2012/0246073 A1 | 9/2012 | Gore et al. |
| 2012/0290938 A1 | 11/2012 | Subbarao et al. |
| 2014/0279274 A1 | 9/2014 | Subbarao et al. |
| 2014/0297457 A1 | 10/2014 | Sapugay et al. |
| 2014/0297458 A1 | 10/2014 | Sapugay et al. |
| 2015/0269573 A1 | 9/2015 | Subbarao et al. |
| 2017/0046311 A1* | 2/2017 | Walker ................. G06F 40/253 |
| 2017/0371861 A1 | 12/2017 | Barborak et al. |
| 2018/0246872 A1* | 8/2018 | Achlow ................ G06F 40/211 |
| 2019/0108257 A1 | 4/2019 | Lefebure et al. |
| 2019/0243893 A1* | 8/2019 | Wahl ..................... G06F 40/289 |
| 2019/0294673 A1 | 9/2019 | Sapugay et al. |
| 2019/0294675 A1 | 9/2019 | Sapugay et al. |
| 2019/0294676 A1 | 9/2019 | Sapugay et al. |
| 2019/0294678 A1 | 9/2019 | Sapugay et al. |
| 2019/0295535 A1 | 9/2019 | Sapugay et al. |
| 2019/0295536 A1 | 9/2019 | Sapugay et al. |
| 2019/0295537 A1 | 9/2019 | Sapugay et al. |
| 2020/0073932 A1* | 3/2020 | Jia ........................... G06N 7/005 |
| 2020/0184959 A1* | 6/2020 | Yasa .................... G10L 15/1815 |
| 2020/0265116 A1* | 8/2020 | Chatterjee ............... G06F 17/16 |
| 2020/0349228 A1* | 11/2020 | Bharara .............. G10L 15/1822 |
| 2021/0004441 A1* | 1/2021 | Sapugay ............... G06F 40/284 |
| 2021/0117625 A1* | 4/2021 | Gao ......................... G06N 5/02 |
| 2022/0036012 A1* | 2/2022 | Sapugay ................ G06N 5/003 |

FOREIGN PATENT DOCUMENTS

| | | |
|---|---|---|
| JP | 05-250405 A | 9/1993 |
| JP | 11-66070 A | 3/1999 |
| JP | 2000330588 A | 11/2000 |
| JP | 2007065029 A | 3/2007 |

OTHER PUBLICATIONS

U.S. Appl. No. 62/869,817, filed Jul. 2, 2019, Sapugay et al.
U.S. Appl. No. 62/869,811, filed Jul. 2, 2019, Sapugay et al.
Office Action for JP Patent Application No. 20211-577217 dated Mar. 7, 2023; 4 pgs. (English translation included—4 pgs).

\* cited by examiner

DERIVING MULTIPLE MEANING REPRESENTATIONS FOR AN UTTERANCE IN A NATURAL LANGUAGE UNDERSTANDING (NLU) FRAMEWORK

CROSS-REFERENCE

This application claims priority from and the benefit of U.S. patent application Ser. No. 16/552,493, entitled "DERIVING MULTIPLE MEANING REPRESENTATIONS FOR AN UTTERANCE IN A NATURAL LANGUAGE UNDERSTANDING (NLU) FRAMEWORK," filed Aug. 27, 2019, which claims priority from and the benefit of U.S. Provisional Application No. 62/869,826, entitled "DERIVING MULTIPLE MEANING REPRESENTATIONS FOR AN UTTERANCE IN A NATURAL LANGUAGE UNDERSTANDING (NLU) FRAMEWORK," filed Jul. 2, 2019, which are incorporated by reference herein in their entirety for all purposes.

BACKGROUND

The present disclosure relates generally to the fields of natural language understanding (NLU) and artificial intelligence (AI), and more specifically, to a hybrid learning system for NLU.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

Certain NLU systems are based on linguistic principles of cognitive constructive grammar. One of these principles is that the shape or form of an utterance is closely related to the meaning of the utterance. As such, it is presently recognized that it is important for NLU systems to be capable of extracting or determining multiple probable ways of understanding utterances to improve the operation of the NLU system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an agent automation framework that is capable of extracting meaning from user utterances, such as requests received by a virtual agent (e.g., a chat agent), and suitably responding to these user utterances. To do this, the agent automation framework includes a NLU framework and an intent-entity model having defined intents and entities that are associated with sample utterances. The NLU framework includes a meaning extraction subsystem that is designed to generate meaning representations for the sample utterances of the intent-entity model to construct an understanding model, as well as generate meaning representations for a received user utterance to construct an utterance meaning model. Additionally, the disclosed NLU framework includes a meaning search subsystem that is designed to search the meaning representations of the understanding model (also referred to as the search space) to locate matches for meaning representations of the utterance meaning model (also referred to as the search key). As such, present embodiments generally address the hard problem posed by NLU by transforming it into a manageable search problem.

Furthermore, it is presently recognized that the performance of the meaning search is enhanced by having multiple meaning representations of a user utterance in the utterance meaning model, as well as multiple meaning representations of the sample utterances in the understanding model, each representing a different understanding or interpretation of an underlying utterance, for comparison. Furthermore, while certain alternative meaning representations improve the likelihood of identifying matches during a meaning search, it is also presently recognized that the meaning search can also consume additional computing resources searching clearly erroneous or substantially redundant meaning representations. Therefore, it is recognized that certain, high-value alternative meaning representations of an utterance (e.g., high-probability and/or sufficiently different meaning representations) should be pursued to enhance the meaning search, while other alternative meaning representations should be discarded to limit computing resource usage and improve the efficiency of the NLU framework.

With the foregoing in mind, present embodiments are directed to a NLU framework that includes a meaning extraction subsystem capable of generating multiple meaning representations for utterances, including sample utterances in the intent-entity model and utterances received from a user. The disclosed meaning extraction subsystem includes a number of different components, which may be implemented as plug-ins for enhanced flexibility. In certain embodiments, these include: a part of speech (POS) plug-in, a correction plug-in, a variation filter (VF) plug-in, a parser plug-in, and a final scoring and filtering (FSF) plug-in. For example, the POS plug-in may include a machine-learning (ML)-based component that receives an utterance and a POS threshold value, and generates a set of potential POS taggings for the utterance, along with corresponding confidence scores for these POS taggings, based on the POS threshold value. The correction plug-in may receive the set of potential POS taggings and apply rules-based or ML-based techniques to modify or remove entries in the set of potential POS taggings. The VF plug-in may receive the set of potential POS taggings and a variation threshold value, and may remove certain entries from the set of potential POS taggings that are not sufficiently different from other entries based on the variation threshold value. The parser plug-in may include a ML-based or rules-based component that receives the set of potential POS taggings (e.g., after correction and/or variability filtering) and generates a respective meaning representation (e.g., an utterance tree) and corresponding confidence score for each entry in the set of potential POS taggings. The FSF plug-in may receive the set of meaning representations, the confidence scores from POS tagging and parsing, and a FSF threshold, and determine a final set of meaning representations for the utterance based on the FSF threshold.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
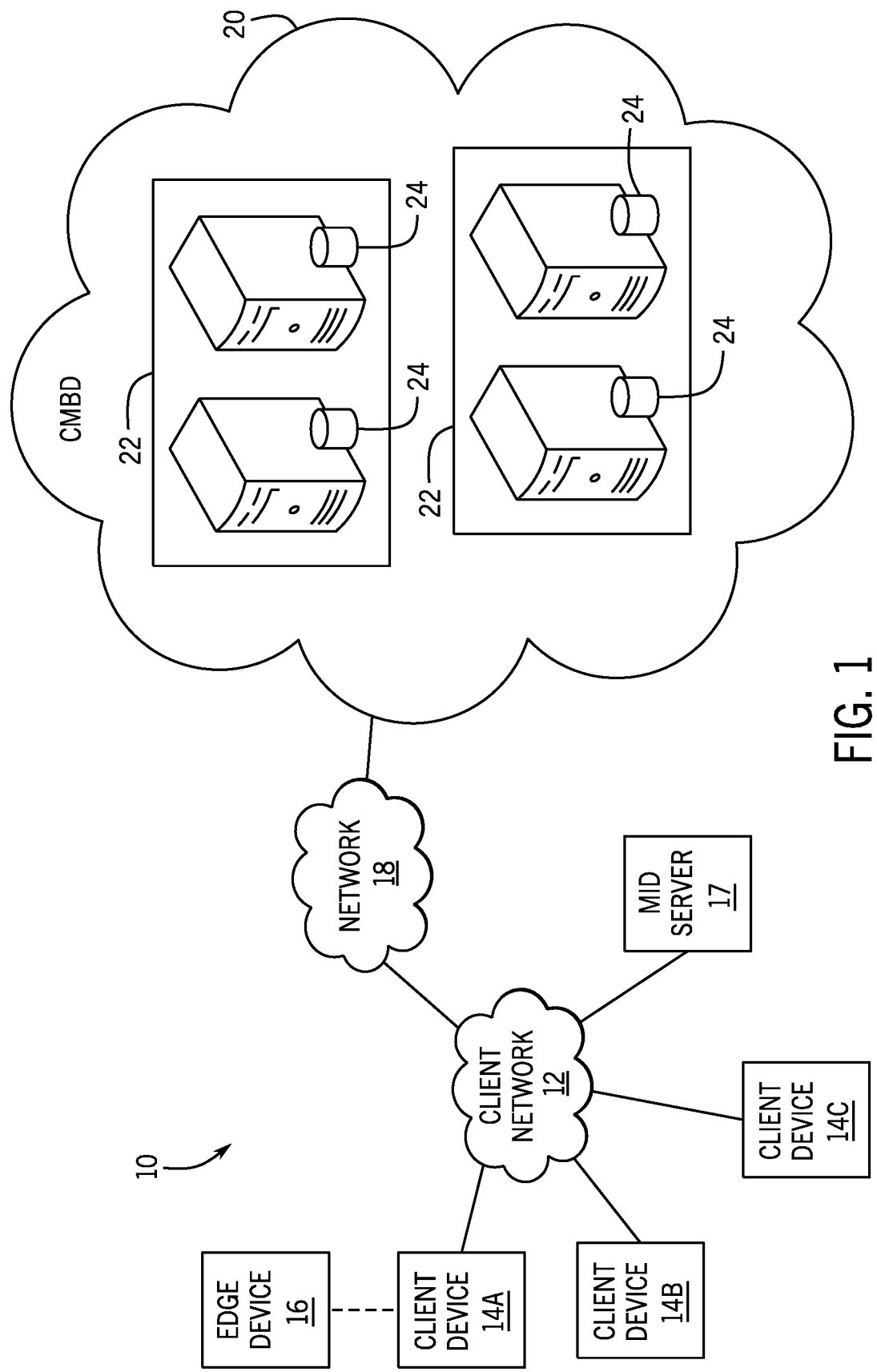
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application," "engine," and "plug-in" refer to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities, artifacts) from natural language utterances based on an understanding model. As used herein, a "behavior engine" or "BE," also known as a reasoning agent or RA/BE, refers to a rule-based agent, such as a virtual agent, designed to interact with users based on a conversation model. For example, a "virtual agent" may refer to a particular example of a BE that is designed to interact with users via natural language requests in a particular conversational or communication channel. With this in mind, the terms "virtual agent" and "BE" are used interchangeably herein. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, autoreplies to service tickets, phone calls, and so forth.

As used herein, an "intent" refers to a desire or goal of a user which may relate to an underlying purpose of a communication, such as an utterance. As used herein, an "entity" refers to an object, subject, or some other parameterization of an intent. It is noted that, for present embodiments, certain entities are treated as parameters of a corresponding intent. More specifically, certain entities (e.g., time and location) may be globally recognized and extracted for all intents, while other entities are intent-specific (e.g., merchandise entities associated with purchase intents) and are generally extracted only when found within the intents that define them. As used herein, "artifact" collectively refers to both intents and entities of an utterance. As used herein, an "understanding model" is a collection of models used by the NLU framework to infer meaning of natural language utterances. An understanding model may include a vocabulary model that associates certain tokens (e.g., words or phrases) with particular word vectors, an intent-entity model, an entity model, or a combination thereof. As used herein an "intent-entity model" refers to a model that associates particular intents with particular sample utterances, wherein entities associated with the intent may be encoded as a parameter of the intent within the sample utterances of the model. As used herein, the term "agents" may refer to computer-generated personas (e.g. chat agents or other virtual agents) that interact with one another within a conversational channel. As used herein, a "corpus" refers to a captured body of source data that includes interactions between various users and virtual agents, wherein the interactions include communications or conversations within one or more suitable types of media (e.g., a help line, a chat room or message string, an email string). As used herein, an "utterance tree" refers to a data structure that stores a meaning representation of an utterance. As discussed, an utterance tree has a tree structure (e.g., a dependency parse tree structure) that represents the syntactic structure of the utterance, wherein nodes of the tree structure store vectors (e.g., word vectors, subtree vectors) that encode the semantic meaning of the utterance.

As used herein, "source data" or "conversation logs" may include any suitable captured interactions between various agents, including but not limited to, chat logs, email strings, documents, help documentation, frequently asked questions (FAQs), forum entries, items in support ticketing, recordings of help line calls, and so forth. As used herein, an "utterance" refers to a single natural language statement made by a user or agent that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML-based techniques may be implemented using an artificial neural network (ANN) (e.g., a deep neural network (DNN), a recurrent neural network (RNN), a recursive neural network, a feedforward neural network). In contrast, "rules-based" methods and techniques refer to the use of rule-sets and ontologies (e.g., manually-crafted ontologies, statistically-derived ontologies) that enable precise adjudication of linguistic structure and semantic understanding to derive meaning representations from utterances. As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity, a token) of an utterance. As used herein, "domain specificity" refers to how attuned a system is to correctly extracting intents and entities expressed in actual conversations in a given domain and/or conversational channel. As used herein, an "understanding" of an utterance refers to an interpretation or a construction of the utterance by the NLU framework. As such, it may be appreciated that different understandings of an utterance may be associated with different meaning representations having different structures (e.g., different nodes, different relationships between nodes), different part-of-speech taggings, and so forth.

As mentioned, a computing platform may include a chat agent, or another similar virtual agent, that is designed to automatically respond to user requests to perform functions or address issues on the platform. When attempting to derive user intent from a natural language utterance, it is presently recognized that a single utterance can have different potential part-of-speech (POS) taggings for the tokens of the utterance, and that these different POS taggings represent different form-derivations of the utterance. As a consequence, a number of different meaning representations (e.g., utterance trees) can be generated for a single utterance, each representing a distinct form-derivation of the utterance. It is presently recognized that giving all possible form-derivations of the utterance due consideration improves intent inference abilities of a NLU framework. However, it is also presently recognized that certain form-derivations of the utterance may be erroneous or substantially redundant to other forms already being considered, which can substantially increase processing and memory resource consumption without substantially improving the intent inference abilities of the NLU framework.

Accordingly, present embodiments are directed to a NLU framework that includes a meaning extraction subsystem that applies ML-based and rules-based techniques to generate multiple meaning representations for a natural language utterance. The meaning extraction subsystem includes a structure subsystem capable of generating multiple meaning representations of sample utterances of an understanding model to expand the search space and/or capable of generating multiple meaning representations of a received user utterance to expand the search key. The disclosed structure subsystem uses ML-based techniques to generate multiple potential part-of-speech (POS) taggings for the utterance, wherein only potential POS taggings having corresponding confidence scores greater than a predefined threshold value are advanced. The disclosed structure subsystem may apply rule-based and/or ML-based correction techniques to modify or eliminate erroneous potential POS taggings. The disclosed structure subsystem may also apply a variability filter to eliminate potential POS taggings that are not sufficiently different from one another based on a predefined variation threshold value. After correction and/or variability filtering, the disclosed structure subsystem uses ML-based or rule-based techniques to generate a respective meaning representation (e.g., an utterance tree) for each remaining potential POS tagging, wherein only meaning representations having corresponding confidence scores greater than a predefined threshold are advanced. Finally, the disclosed structure subsystem applies a final scoring and filtering step that considers the confidence scores of the advanced meaning representations, as well as the underlying confidence scores of the corresponding POS taggings, to generate a final score, and removes meaning representations having final scores below a predefined threshold. As such, the disclosed structure subsystem effectively expands the number of form-derivations that are generated for the search key and/or search space of the meaning search, improving the intent inference capabilities of the NLU framework, while eliminating erroneous or substantially redundant form-derivations to reduce resource consumption and improve efficiency of the NLU framework.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 18 (e.g., the Internet), and a cloud-based platform 20. In some implementations, the cloud-based platform 20 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14 may be computing systems and/or other types of computing devices generally referred to as Internet of Things (IoT) devices that access cloud computing services, for example, via a web browser application or via an edge device 16 that may act as a gateway between the client devices 14 and the platform 20. FIG. 1 also illustrates that the client network 12 includes an administration or managerial device, agent, or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG.

1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14 via the client network 12 and network 18. The network hosting the platform 20 provides additional computing resources to the client devices 14 and/or the client network 12. For example, by utilizing the network hosting the platform 20, users of the client devices 14 are able to build and execute applications for various enterprise, IT, and/or other organization-related functions. In one embodiment, the network hosting the platform 20 is implemented on the one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server 24 can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers 22 with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 24 and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
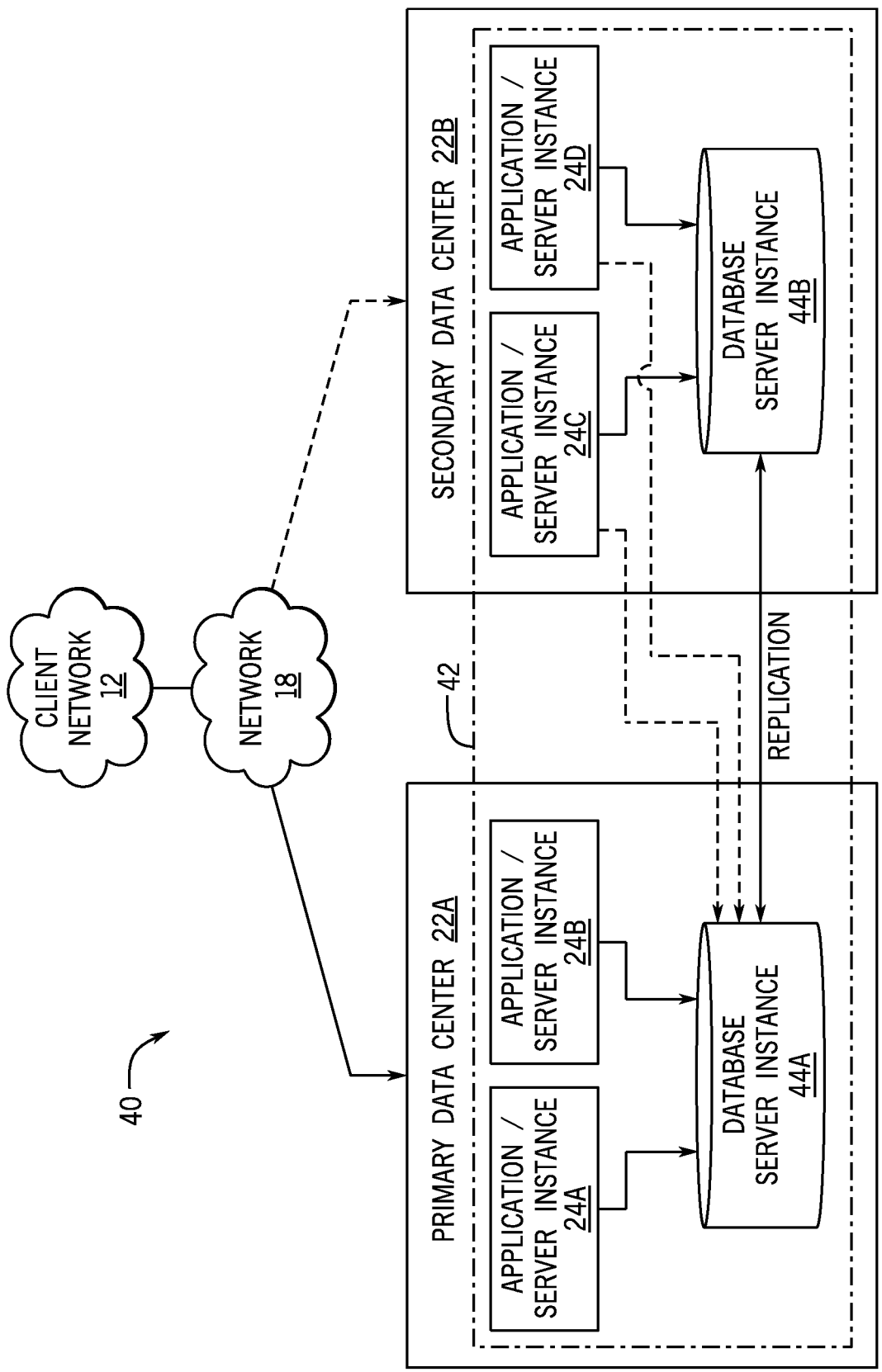
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A, 24B, 24C, 24D and virtual database servers 44A, 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
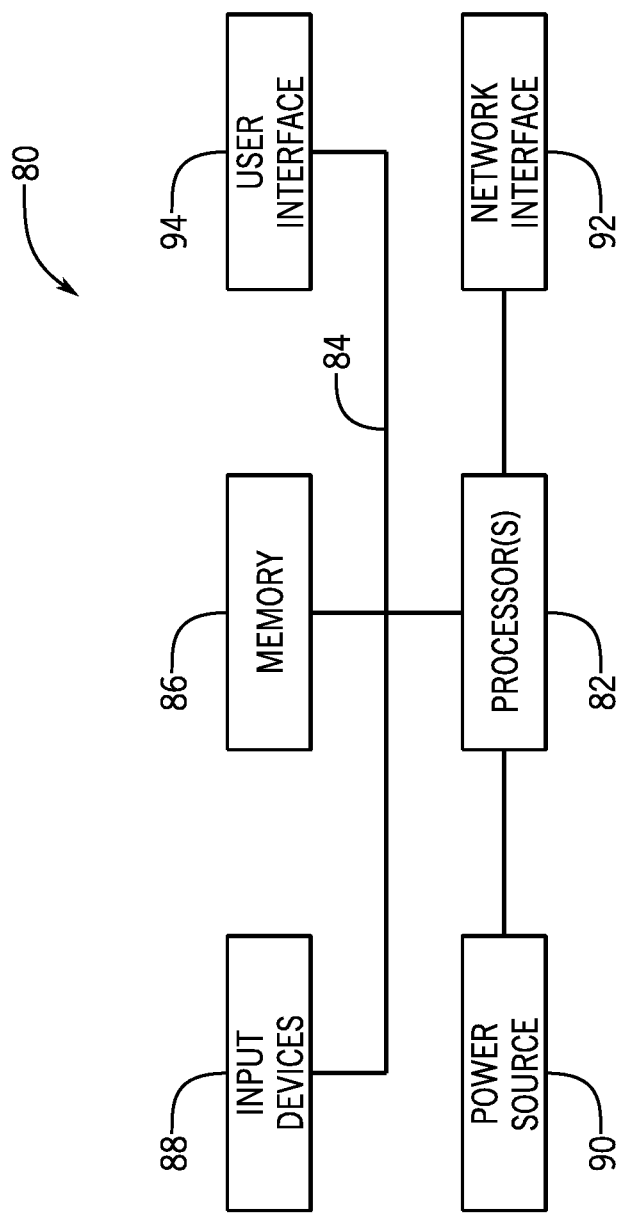
FIG. 3 is a block diagram of a computing device utilized in a computing system that may be present in FIG. 1 or 2, in accordance with aspects of the present technique.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example of an architecture that may utilize NLU technologies. In particular, the cloud-based platform 20 may include or store a large corpus of source data that can be mined, to facilitate the generation of a number of outputs, including an intent-entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent-entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
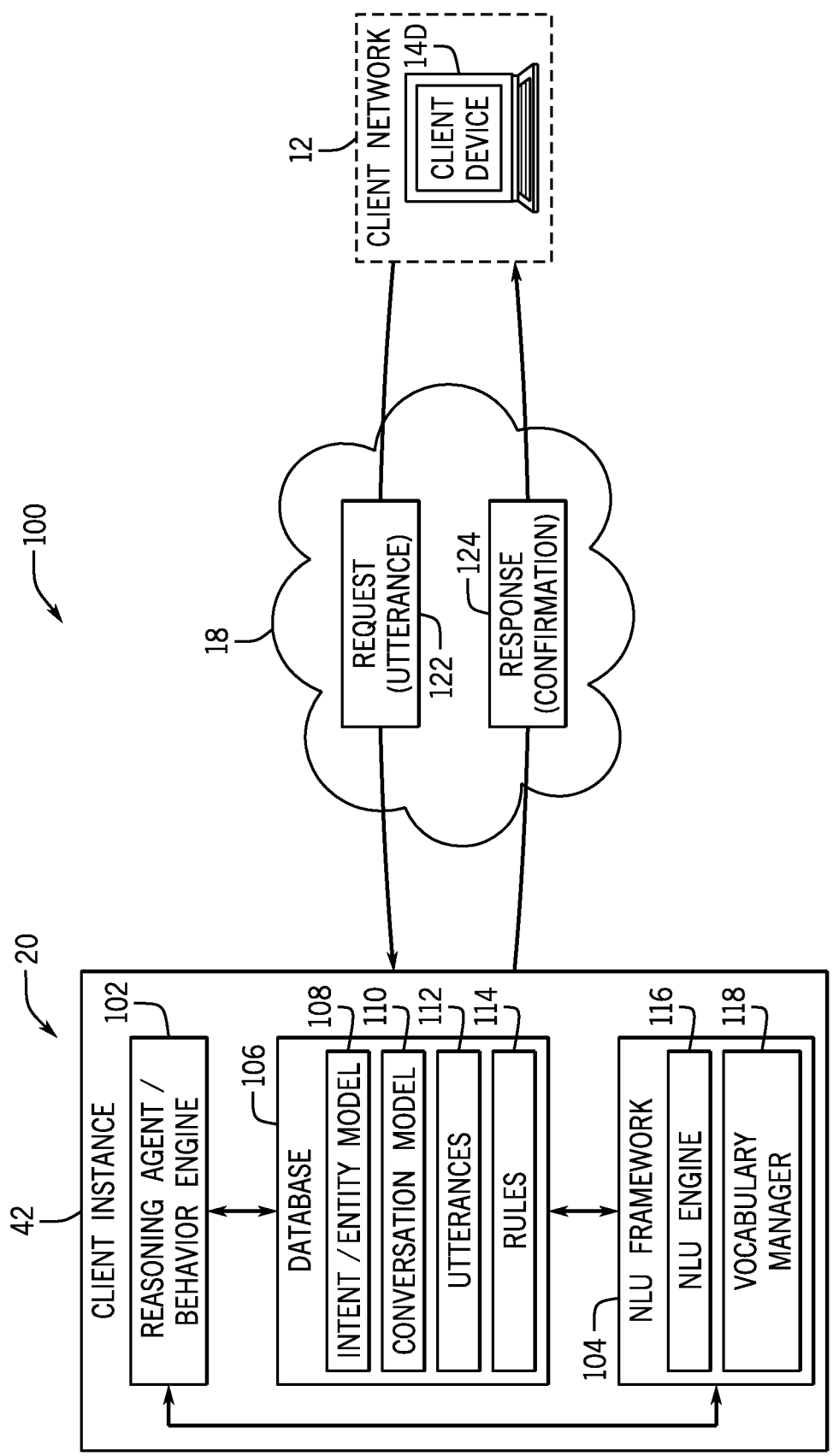
FIG. 4A is a schematic diagram illustrating an embodiment of an agent automation framework including an NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a behavior engine (BE) 102, an NLU framework 104, and a database 106, which are communicatively coupled within the client instance 42. The BE 102 may host or include any suitable number of virtual agents or personas that interact with the user of the client device 14D via natural language user requests 122 (also referred to herein as user utterances 122 or utterances 122) and agent responses 124 (also referred to herein as agent utterances 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent-entity model 108, a conversation model 110, a corpus of utterances 112, and a collection of rules 114 in one or more tables (e.g., relational database tables) of the database 106. The intent-entity model 108 stores associations or relationships between particular intents and particular entities via particular sample utterances. In certain embodiments, the intent-entity model 108 may be authored by a designer using a suitable authoring tool. In other embodiments, the agent automation framework 100 generates the intent-entity model 108 from the corpus of utterances 112 and the collection of rules 114 stored in one or more tables of the database 106. The intent-entity model 108 may also be determined based on a combination of authored and ML techniques, in some embodiments. In any case, it should be understood that the disclosed intent-entity model 108 may associate any suitable combination of intents and/or entities with respective ones of the corpus of utterances 112. For embodiments discussed below, sample utterances of the intent-entity model 108 are used to generate meaning representations of an understanding model to define the search space for a meaning search.

For the embodiment illustrated in FIG. 4A, the conversation model 110 stores associations between intents of the intent-entity model 108 and particular responses and/or actions, which generally define the behavior of the BE 102. In certain embodiments, at least a portion of the associations within the conversation model are manually created or predefined by a designer of the BE 102 based on how the designer wants the BE 102 to respond to particular identified artifacts in processed utterances. It should be noted that, in different embodiments, the database 106 may include other database tables storing other information related to intent classification, such as a tables storing information regarding compilation model template data (e.g., class compatibility rules, class-level scoring coefficients, tree-model comparison algorithms, tree substructure vectorization algorithms), meaning representations, and so forth.

For the illustrated embodiment, the NLU framework 104 includes an NLU engine 116 and a vocabulary manager 118. It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118 (which may be part of the vocabulary subsystem discussed below) addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent-entity model 108 and the conversation model 110 have been created, the agent automation framework 100 is designed to receive a user utterance 122 (in the form of a natural language request) and to appropriately take action to address the request. For example, for the embodiment illustrated in FIG. 4A, the BE 102 is a virtual agent that receives, via the network 18, the utterance 122 (e.g., a natural language request in a chat communication) submitted by the client device 14D disposed on the client network 12. The BE 102 provides the utterance 122 to the NLU framework 104, and the NLU engine 116, along with the various subsystems of the NLU framework discussed below, processes the utterance 122 based on the intent-entity model 108 to derive artifacts (e.g., intents and/or entities) within the utterance. Based on the artifacts derived by the NLU engine 116, as well as the associations within the conversation model 110, the BE 102 performs one or more particular predefined actions. For the illustrated embodiment, the BE 102 also provides a response 124 (e.g., a virtual agent utterance 124 or confirmation) to the client device 14D via the network 18, for example, indicating actions performed by the BE 102 in response to the received user utterance 122. Additionally, in certain embodiments, the utterance 122 may be added to the utterances 112 stored in the database 106 for continued learning within the NLU framework 104.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the similarity scoring subsystem discussed below may be hosted by a separate instance (e.g., an enterprise instance) that is communicatively coupled to the client instance 42, as well as other client instances, to enable improved meaning searching for suitable matching meaning representations within the search space to enable identification of artifact matches for the utterance 122.

Figure 4B:
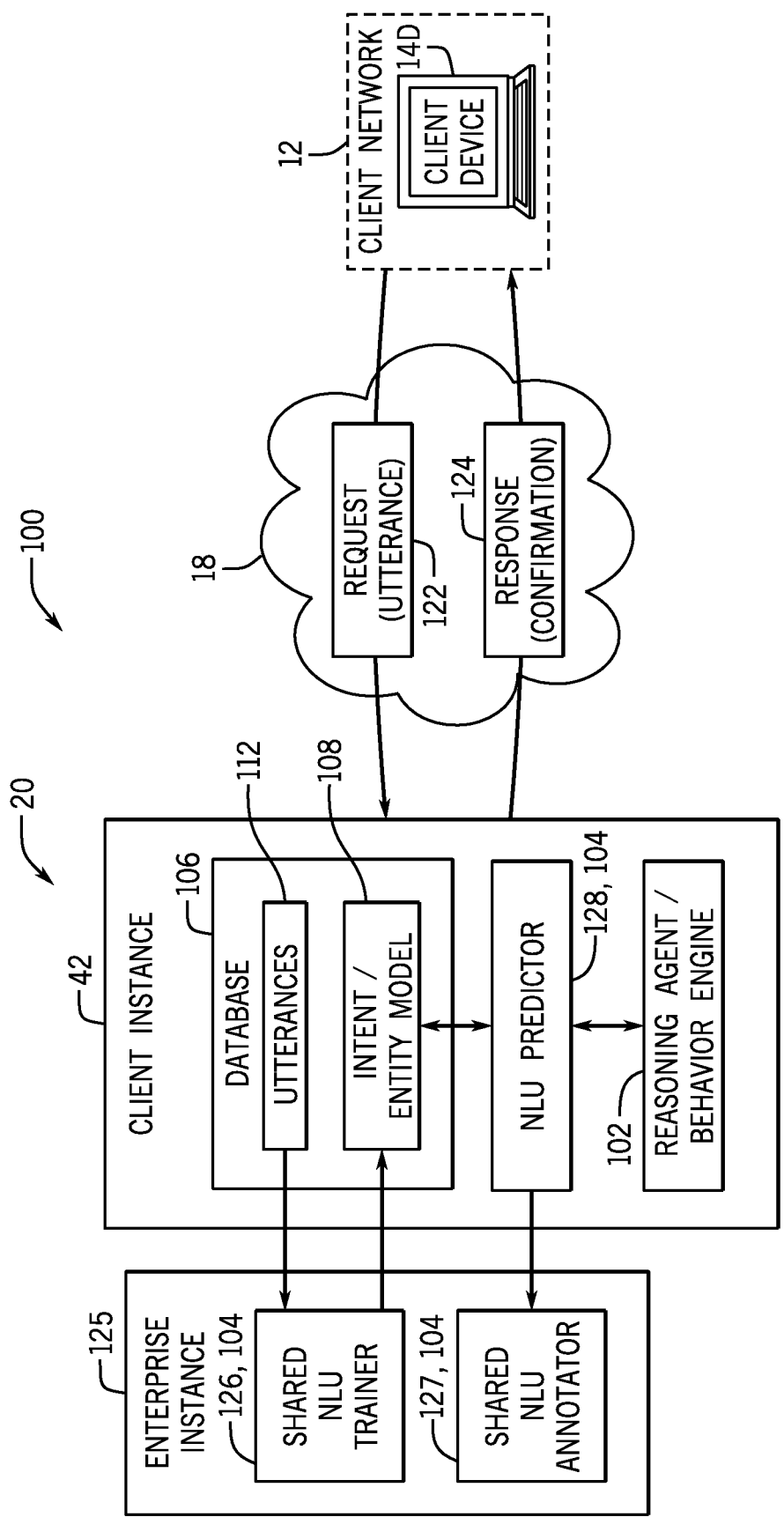
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud-based platform 20. The illustrated enterprise instance 125 is communicatively coupled to exchange data related to artifact mining and classification with any suitable number of client instances via a suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform distinct processes within the NLU framework 104. These components include: a shared NLU trainer 126 hosted by the enterprise instance 125, a shared NLU annotator 127 hosted by the enterprise instance 125, and an NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent-entity model 108. Once the intent-entity model 108 has been generated, when the BE 102 receives the user utterance 122 provided by the client device 14D, the NLU predictor 128 passes the utterance 122 and the intent-entity model 108 to the shared NLU annotator 127 for parsing and annotation of the utterance 122. The shared NLU annotator 127 performs semantic parsing, grammar engineering, and so forth, of the utterance 122 based on the intent-entity model 108 and returns meaning representations of the utterance 122 to the NLU predictor 128 of client instance 42. The NLU predictor 128 then uses these annotated structures of the utterance 122, discussed below in greater detail, to identify matching intents from the intent-entity model 108, such that the BE 102 can perform one or more actions based on the identified intents. It may be appreciated that the shared NLU annotator 127 may correspond to the meaning extraction subsystem 150, and the NLU predictor may correspond to the meaning search subsystem 152, of the NLU framework 104, as discussed below.

Figure 5:
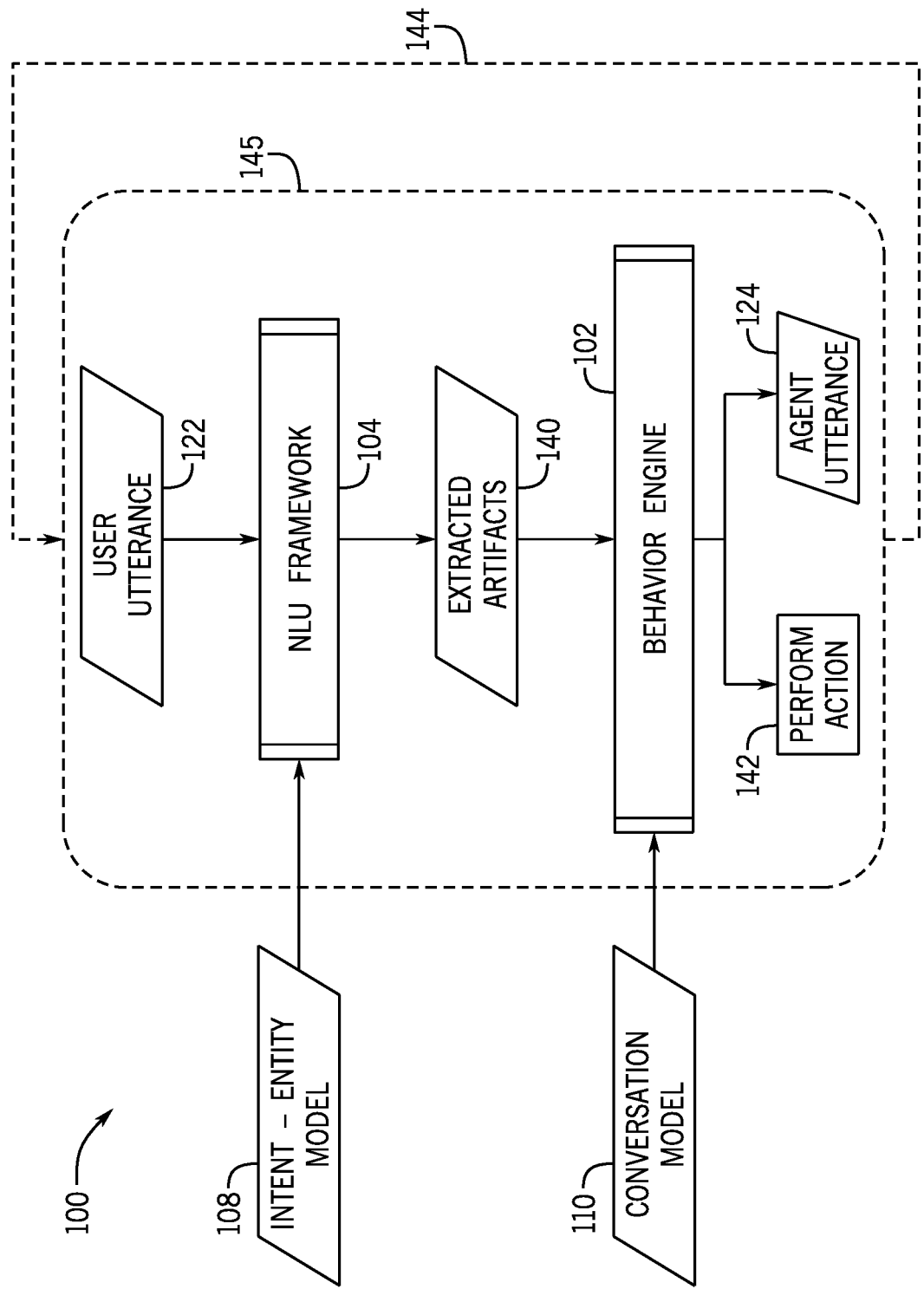
FIG. 5 is a flow diagram illustrating an embodiment of a process by which an agent automation framework, including an NLU framework and a Behavior Engine framework, extracts intents and/or entities from and responds to a user utterance, in accordance with aspects of the present technique.

FIG. 5 is a flow diagram depicting a process 145 by which the behavior engine (BE) 102 and NLU framework 104 perform respective roles within an embodiment of the agent automation framework 100. For the illustrated embodiment, the NLU framework 104 processes a received user utterance 122 to extract artifacts 140 (e.g., intents and/or entities) based on the intent-entity model 108. The extracted artifacts 140 may be implemented as a collection of symbols that represent intents and entities of the user utterance 122 in a form that is consumable by the BE 102. As such, these extracted artifacts 140 are provided to the BE 102, which processes the received artifacts 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
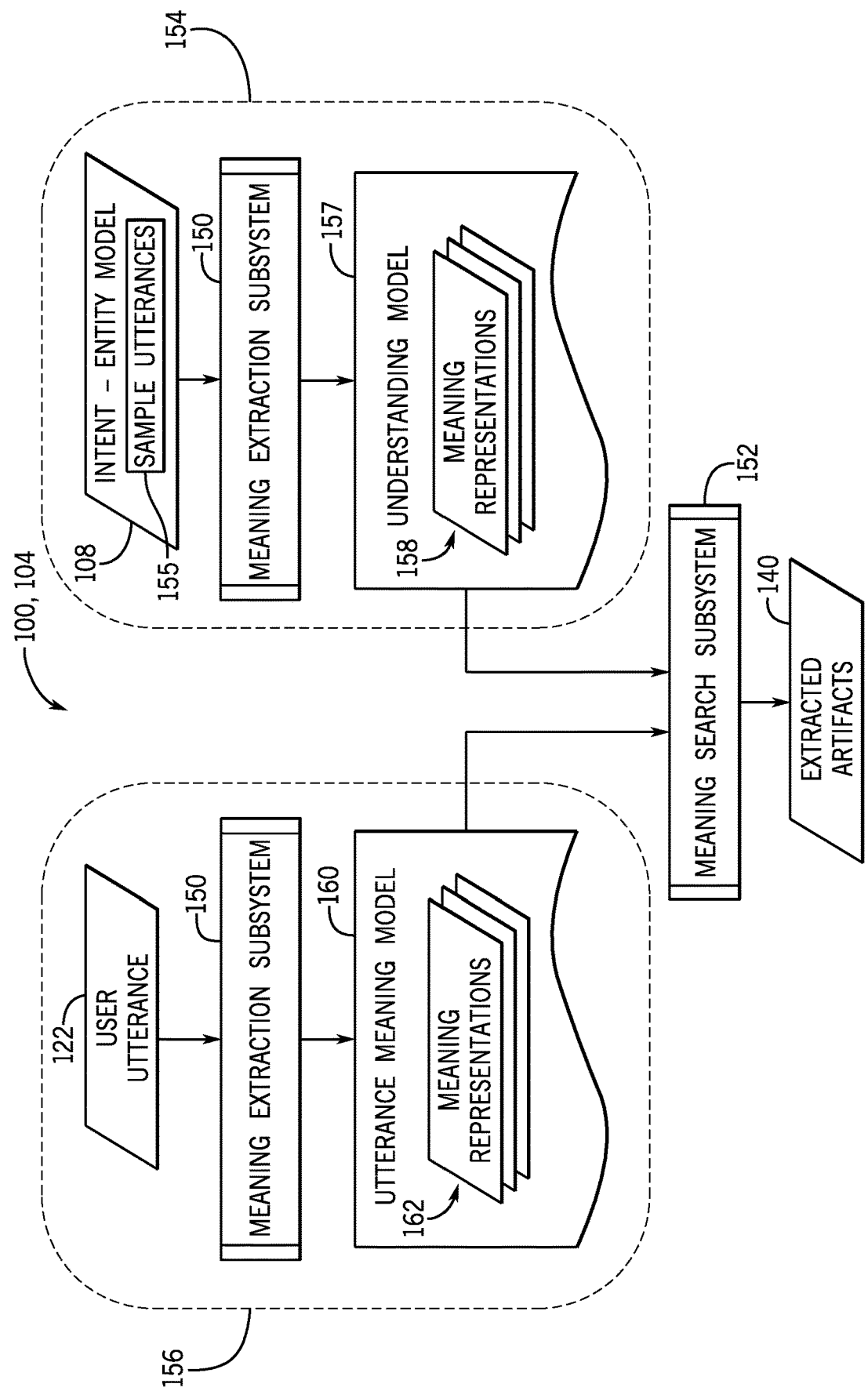
FIG. 6 is a block diagram illustrating an embodiment of the NLU framework, including a meaning extraction subsystem and a meaning search subsystem, wherein the meaning extraction subsystem generates meaning representations from a received user utterance to yield an utterance meaning model and generates meaning representations from sample utterances of an understanding model to yield understanding model, and wherein the meaning search subsystem compares meaning representations of the utterance meaning model to meaning representations of the understanding model to extract artifacts (e.g., intents and entities) from the received user utterance, in accordance with aspects of the present technique.

As mentioned, the NLU framework 104 includes two primary subsystems that cooperate to convert the hard problem of NLU into a manageable search problem—namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, a right-hand portion 154 of FIG. 6 illustrates the meaning extraction subsystem 150 of the NLU framework 104 receiving the intent-entity model 108, which includes sample utterances 155 for each of the various artifacts of the model. The meaning extraction subsystem 150 generates an understanding model 157 that includes meaning representations 158 (e.g., parse tree structures) of the sample utterances 155 of the intent-entity model 108. In other words, the understanding model 157 is a translated or augmented version of the intent-entity model 108 that includes meaning representations 158 to enable searching (e.g., comparison and matching) by the meaning search subsystem 152, as discussed in more detail below. As such, it may be appreciated that the right-hand portion 154 of FIG. 6 is generally performed in advance of receiving the user utterance 122, such as on a routine, scheduled basis or in response to updates to the intent-entity model 108.

For the embodiment illustrated in FIG. 6, a left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations 158 of the understanding model 157 define a search space in which the search key can be sought. Thus, the meaning search subsystem 152 searches the meaning representations 158 of the understanding model 157 to locate one or more artifacts that match the meaning representation 162 of the utterance meaning model 160 as discussed below, thereby generating the extracted artifacts 140.

Figure 7:
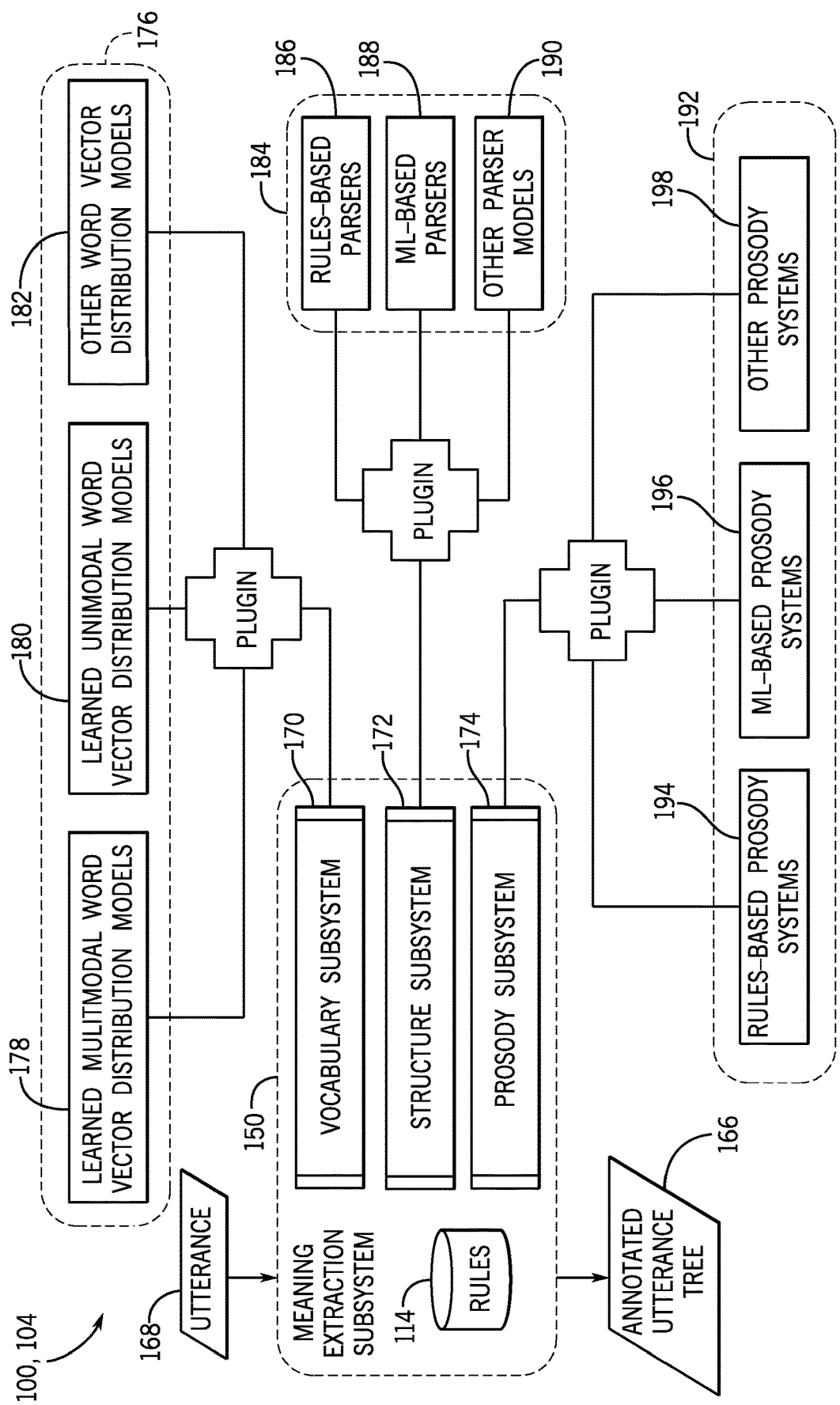
FIG. 7 is a block diagram illustrating an embodiment of the meaning extraction subsystem using a combination of rules-based methods and machine-learning(ML)-based methods within a vocabulary subsystem, a structure subsystem, and a prosody subsystem of the NLU framework, to generate a meaning representation for an utterance, in accordance with aspects of the present technique.

The meaning extraction subsystem of FIG. 6 itself uses a number of subsystems of the NLU framework 104 that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses a rules-based methods interleaved with ML-based methods to generate an annotated utterance tree 166 for an utterance 168, which may be either a user utterance 122 or one of the sample utterances 155 of the intent-entity model 108, as discussed above with respect to FIG. 6. More specifically, FIG. 7 illustrates how embodiments of the meaning extraction subsystem 150 can utilize a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 uses three plug-in-supported subsystems of the NLU framework 104, namely a vocabulary subsystem 170, a structure subsystem 172, and a prosody subsystem 174, and the various outputs of these subsystems are combined according to the stored rules 114 to generate the utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms, as discussed below with respect to FIG. 12. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plug-ins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based on the stored rules 114 to generate word vectors for nodes of the utterance tree 166, as discussed below. Moreover, the word vector distribution models 178, 180, and/or 182 can be continually updated based on unsupervised learning performed on received user utterances 122, as discussed below with respect to FIG. 12.

For the embodiment illustrated in FIG. 7, the structure subsystem 172 of the meaning extraction subsystem 150 analyzes a linguistic shape of the utterance 168 using a combination of rule-based and ML-based structure parsing plug-ins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plug-ins 196. The illustrated prosody plug-ins 192 include rule-based prosody systems 194, ML-based prosody systems 196, and other suitable prosody systems 198. Using these plug-ins, the prosody subsystem 174 analyzes the utterance 168 for prosodic cues, including written prosodic cues such as rhythm (e.g., chat rhythm, such as utterance bursts, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the utterance tree 166, as discussed below.

As such, for the embodiment of the meaning extraction subsystem 150 illustrated in FIG. 7, the vocabulary subsystem 170, the structure subsystem 172, and the prosody subsystem 174 of the NLU framework 104 cooperate to generate the utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the utterance tree 166 from the utterance 168. The resulting utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 8:
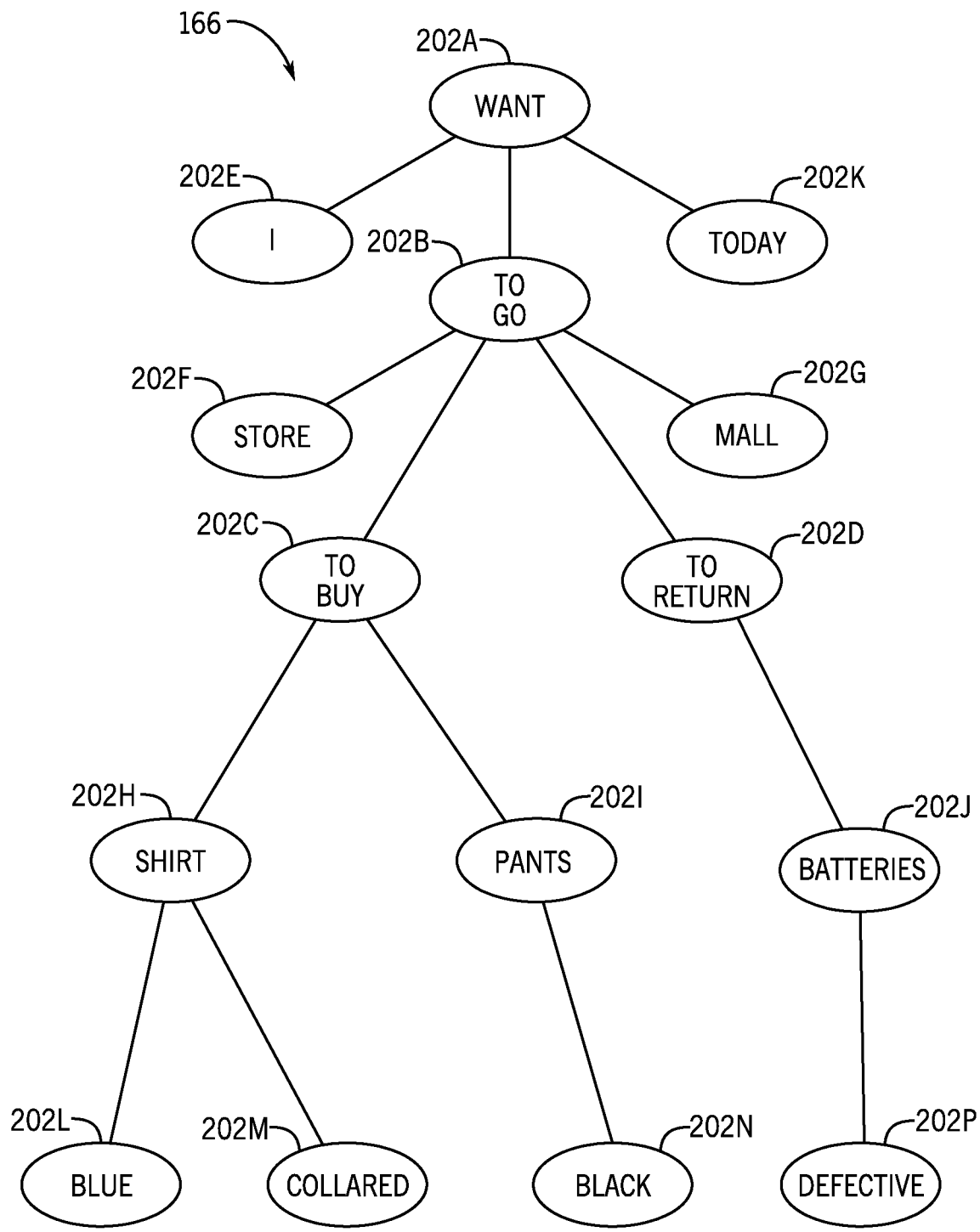
FIG. 8 is a diagram illustrating an example of an utterance tree generated for an utterance, in accordance with aspects of the present technique.

For example, FIG. 8 is a diagram illustrating an example of an utterance tree 166 generated for an utterance 168, in accordance with an embodiment of the present approach. As mentioned, the utterance tree 166 is a data structure that is generated by the meaning extraction subsystem 150 based on the utterance 168. In certain embodiments, the meaning representations 162 of the utterance meaning model 160 and the meaning representations 158 of the understanding model 157 are (or are derived from) utterance trees, while in other embodiments, other parse structures can be used. For the example illustrated in FIG. 8, the utterance tree 166 is based on an example utterance, "I want to go to the store by the mall today to buy a blue, collared shirt and black pants and also to return some defective batteries." The illustrated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, each node representing a particular word or phrase of the utterance 168. It may be noted that each of the nodes 202 may also be described as representing a particular subtree of the utterance tree 166, wherein a subtree can include one or more nodes 202.

As mentioned, the form or shape of the utterance tree 166 illustrated in FIG. 8 is determined by the prosody subsystem 174 and the structure subsystem 172 and represents the syntactic, grammatical meaning of the example utterance. More specifically, the prosody subsystem 174 breaks the utterance into intent segments, while the structure subsystem 172 constructs the utterance tree 166 from these intent segments. Each of the nodes 202 store or reference a respective word vector that is determined by the vocabulary subsystem 170 to indicate the semantic meaning of the particular word or phase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, each of the nodes 202 is annotated by the structure subsystem 172 with additional information about the word or phrase represented by the node. For example, in FIG. 8, each of the nodes 202 has a class or part-of-speech (POS) annotation. In particular, for the example utterance tree illustrated in FIG. 8, certain subtrees or nodes (e.g., nodes 202A, 202B, 202C, and 202D) are annotated to be verb nodes, and certain subtrees or nodes (e.g., nodes 202E, 202F, 202G, 202H, 202I, and 202J) are annotated to be subject or object nodes, and certain subtrees or nodes (e.g., nodes 202K, 202L, 202M, 202N, and 202P) are annotated to be modifier nodes (e.g., subject modifier nodes, object modifier nodes, verb modifier nodes) by the structure subsystem 172. These class annotations are used by the meaning search subsystem 152 when comparing meaning representations that are generated from utterance trees, like the example utterance tree 166 illustrated in FIG. 8. As such, it may be appreciated that the utterance tree 166, from which the meaning representations are generated, serves as a basis (e.g., an initial basis) for intent and/or entity extraction.

Referring briefly to FIG. 6, as noted, performance of the meaning search by the NLU framework 104 can be improved by enabling the NLU framework to derive and compare multiple, alternative forms of received user utterances 122 to multiple, alternative forms of the sample utterances 155 of the intent-entity model 108. For example, in certain embodiments, during the meaning search performed by the meaning search subsystem 152, a search space may be defined that includes meaning representations 158 of the understanding model 157, and potentially meaning representations of additional understanding models. Additionally, in certain embodiments, this search space may be iteratively pruned based on the CCG form of the user utterance 122 being search, wherein the CCG form is captured in the structure of the meaning representations 162 of the utterance meaning model 160. In particular, the multiple, alternative meaning representations derived from a user utterance 122 can be used to determine what other comparable meaning representations 158 exist in the search space, wherein non-comparable meaning representations can be eliminated from consideration to improve search latency and over-all computing resource usage. As such, having multiple, alternative meaning representations 162 of the user utterance 122 with different CCG forms in the utterance meaning model 160 can result in dramatically different pruning of the search space during the meaning search, enabling a more comprehensive meaning search of the search space.

Furthermore, when the meaning search subsystem 152 is comparing meaning representations 162 of the utterance meaning model 160 to meaning representations 158 of the understanding model 157, having multiple, alternative forms of the meaning representations 162 and 158 can also be advantageous. For example, in certain embodiments, a CCG form class database (e.g., part of the database 106) may store a number of different CCG forms (e.g., a verb-led CCG form, a noun-led CCG form). Each CCG form is associated with a collection of mathematical functions that enable the meaning search subsystem 152 to calculate a similarity score between meaning representations 162 of the utterance meaning model 160 having the CCG form and meaning representations 158 of the understanding model 157 having the same CCG form (or a different, comparable CCG form). Additionally, in certain embodiments, the meaning search subsystem 152 may iteratively compare an expanding number of nodes of two comparable meaning representations using these mathematical functions, and the order in which the nodes are considered is also dependent on the form or shape of the meaning representations. As such, having multiple, alternative meaning representations 162 with different CCG forms in the utterance meaning model 160 enables different comparisons to different meaning representations 158 of the understanding model 157 using different mathematical functions, which also enables a more comprehensive meaning search.

Figure 9:
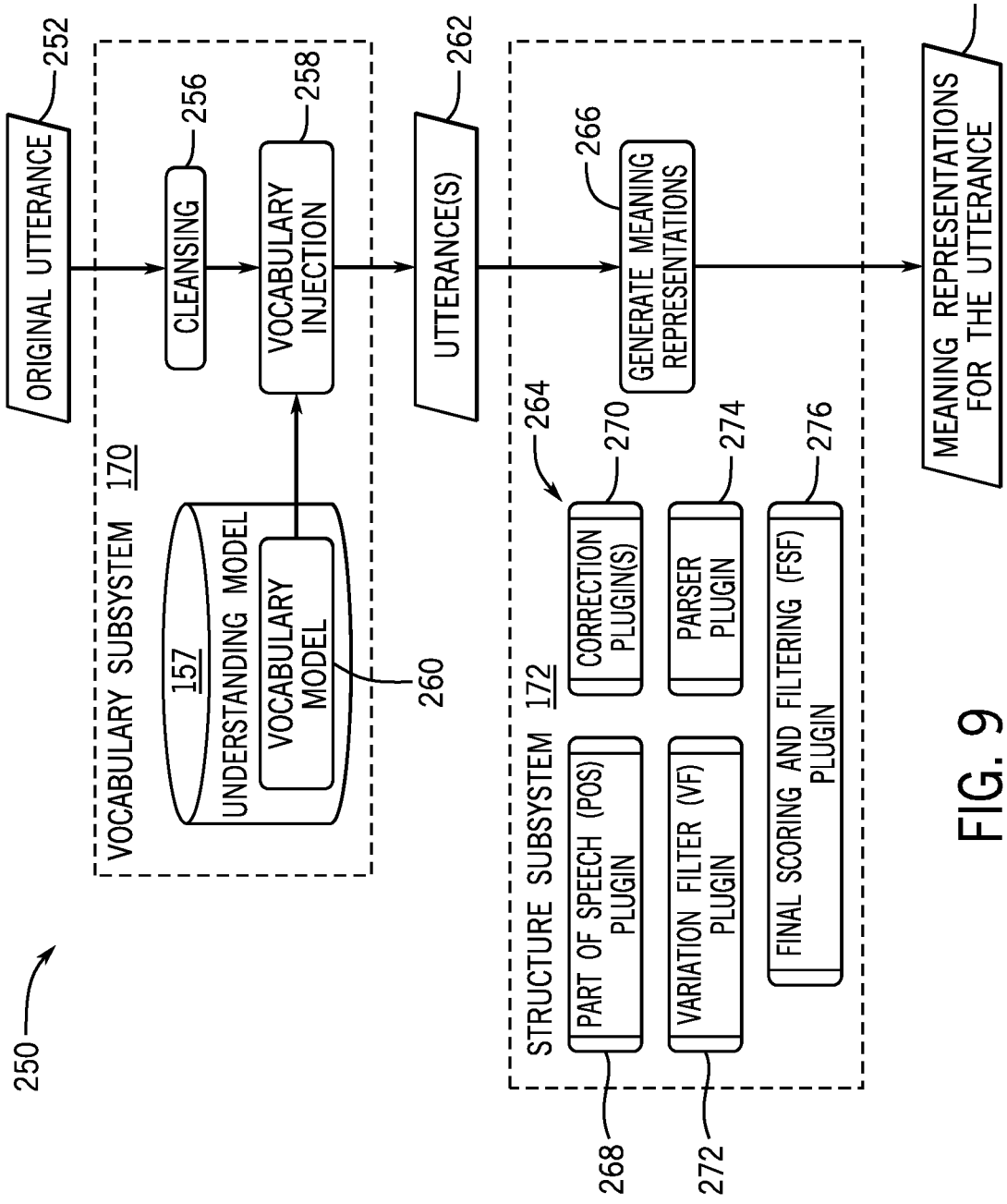
FIG. 9 is a flow diagram illustrating an embodiment of a process by which the meaning extraction subsystem of the NLU framework, including the vocabulary subsystem and the structure subsystem, generates re-expressions and meaning representations of an utterance, in accordance with aspects of the present technique.

With the foregoing in mind, FIG. 9 is a flow diagram illustrating an embodiment of a process 250 by which the meaning extraction subsystem 150 of the NLU framework 104 generates re-expressions of an original utterance 252, and then generates a set 254 of meaning representations based on these re-expressions and the original utterance 252. It may be appreciated that, in certain cases, the original utterance 252 may be a received user utterance 122, and the resulting set 254 of meaning representations may become meaning representations 162 of the utterance meaning model 160. In other cases, the original utterance 252 may be one of the sample utterances 155 of the intent-entity model 108. For the embodiment illustrated in FIG. 9, a portion of the process 250 is performed by the vocabulary subsystem 170 of the meaning extraction subsystem 150 of the NLU framework 104, while another portion is performed by the structure subsystem 172 of the meaning extraction subsystem 150. In other embodiments, the steps of the process 250 may be performed by other suitable components of the NLU framework 104. Additionally, the process 250 may be stored in a suitable memory (e.g., memory 86) and executed by a suitable processor (e.g., processor(s) 82) associated with the client instance 42 or the enterprise instance 125, as discussed above with respect to FIGS. 3, 4A, and 4B.

For the embodiment illustrated in FIG. 9, the process 250 begins with the vocabulary subsystem 170 of the NLU framework 104 cleansing (block 256) the original utterance 252. For example, the vocabulary subsystem 170 may access and apply rules 114 stored in the database 106 to modify certain tokens (e.g., words, phrases, punctuation, emojis) of the utterance. For example, in certain embodiments, cleansing may involve applying a rule that removes non-textual elements (e.g., emoticons, emojis, punctuation) from the original utterance 252. In certain embodiments, cleansing may involve correcting misspellings or typographical errors in the utterance. Additionally, in certain embodiments, cleansing may involve substituting certain tokens with other tokens. For example, the vocabulary subsystem 170 may apply a rule that that all entities with references to time or color with a generic or global entity (e.g., "TIME", "COLOR").

For the embodiment illustrated in FIG. 9, the process 250 continues with the vocabulary subsystem 170 performing vocabulary injection (block 258) on the original utterance 252. Vocabulary injection generally involves introducing multiple re-renderings of the original utterance 252. For instance, phraseology and/or terminology may be replaced with more discourse-appropriate phrases and/or terms as dictated by a vocabulary model 260 of the understanding model 157. In certain embodiments, multiple phrases and/or terms may be replaced, and the various permutations of such replacements are used to generate a set 262 of utterances based on the original utterance 252. For example, in certain embodiments, the vocabulary subsystem 170 may access the vocabulary model 260 of the understanding model 157 to identify alternative vocabulary that can be used to generate re-expressions of the utterances having different tokens. By way of specific example, in an embodiment, the vocabulary subsystem 170 may determine that a synonym for "developer" is "employee," and may generate a new utterance in which the term "developer" is substituted by the term "employee."

For the embodiment illustrated in FIG. 9, after cleansing and vocabulary injection, the set 262 of utterances is provided to the structure subsystem 172 for POS tagging and parsing. It may be appreciated that the set 262 of utterances may include the original utterance 252 or a cleansed version of the original utterance, and may include any suitable number of alternative re-expressions utterances generated through the vocabulary injection of block 258. It may be noted that, in certain circumstances, the vocabulary injection of block 258 may not generate re-expressions of the original utterance 252, and as such, the set 262 of utterances may only include the original utterance 252, or a cleansed version thereof. In other embodiments, the original utterance 252 may be provided directly to the structure subsystem 172 without the cleansing of block 256 or the vocabulary injection of block 258.

Upon receipt of the set 261 of utterances, the structure subsystem 172 uses a set of plug-ins 264 to generate (block 266) the set 254 of one or more meaning representations that are representative of the original utterance 252. In other embodiments, the set of plug-ins 264 may instead be implemented as non-pluggable applications or modules of the meaning extraction subsystem 150 or the NLU framework 104. However, it is presently recognized that the disclosed pluggable design of the illustrated structure subsystem 172 enables the NLU framework 104 to have greater flexibility. For example, support for additional languages can be added to the NLU framework 104 by switching the set of plug-ins 264 to another set designed (e.g., programmed, trained) for a different language or a different domain.

For the embodiment illustrated in FIG. 9, the set of plug-ins 264 of the structure subsystem 172 include: a part of speech (POS) plug-in 268, correction plug-ins 270, a variation filter (VF) plug-in 272, a parser plug-in 274, and a final scoring and filtering (FSF) plug-in 276. The functions of the plug-ins 264 are discussed in greater detail with respect to FIG. 10. In general, the POS plug-in 268 includes a ML-based component (e.g., a feedforward artificial neural network) that is trained to perform POS tagging of each token of an utterance with an associated part of speech (e.g., verb, noun, adjective, pronoun, adverb). The POS plug-in 268 is designed to output multiple potential POS taggings of an utterance, as well as corresponding confidence scores for each potential POS tagging of the utterance. The correction plug-in(s) 270 include a POS correction plug-in that applies ML-based techniques or applies rules (e.g., stored in the database 106) to modify or remove potential POS taggings generated by the POS plug-in 268 that are known to be erroneous. The VF plug-in 272 applies a mathematical comparison of potential POS taggings generated by the POS plug-in 268, and removes POS taggings that are not sufficiently different from one another. The parser plug-in 274 may include a rules-based or ML-based component (e.g., a feedforward artificial neural network) that is designed and/or trained to generate a respective meaning representation for each of the remaining candidate POS taggings, as well as corresponding confidence scores for the parsing operation. The correction plug-in(s) 270 also include a parser correction plug-in that applies ML-based techniques or applies rules (e.g., stored in the database 106) to modify or remove potential meaning representations generated by the parser plug-in 274 that are known to be erroneous. The FSF plug-in 276 determines a final confidence score for each generated meaning representation, and then outputs a final set 254 of meaning representations having a corresponding final confidence score that is greater than a predefined threshold.

Figure 10:
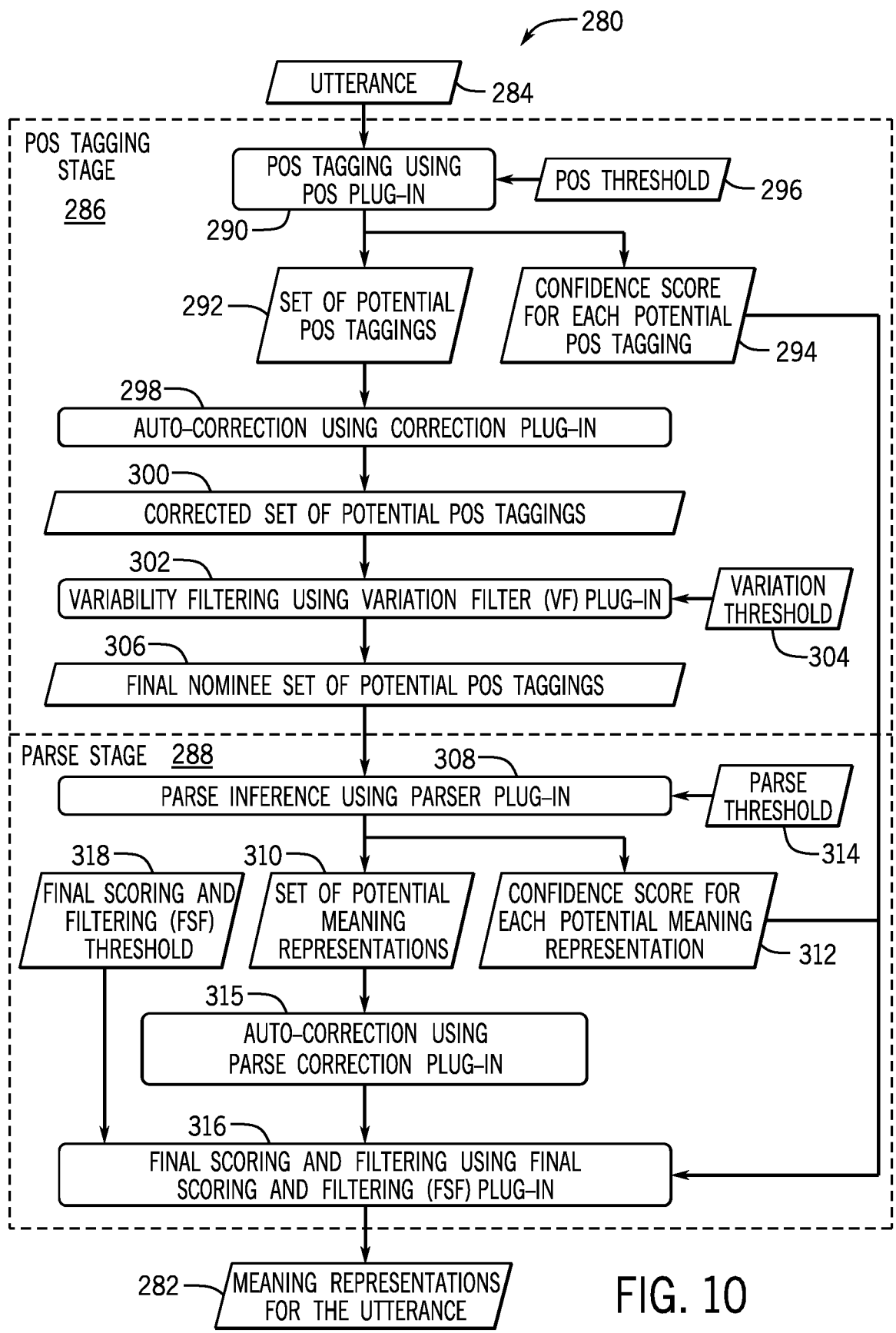
FIG. 10 is a flow diagram illustrating an embodiment of a process by which the structure subsystem of the NLU framework generates different meaning representations for an utterance, in accordance with aspects of the present technique.

FIG. 10 is a flow diagram illustrating an embodiment of a process 280 by which the structure subsystem 172 of the NLU framework 104 can generate multiple, alternative meaning representations 282 for an utterance 284. As such, the process 280 of FIG. 10 corresponds to block 266 of FIG. 9. With reference to FIG. 9, it may be appreciated that the utterance 284 may be one of the set 262 of utterances, such as a received user utterance 122, one of the sample utterances 155 of the intent-entity model 108, an utterance generated from cleansing (block 256), or an utterance generated from vocabulary injection (block 258), while the resulting meaning representations 282 may be part or all of the set 254 of meaning representations of the original utterance 252. For the embodiment illustrated in FIG. 10, the process 280 may be stored in a suitable memory (e.g., memory 86) and executed by a suitable processor (e.g., processor(s) 82) associated with the client instance 42 or the enterprise instance 125, as discussed above with respect to FIGS. 3, 4A, and 4B.

For the embodiment illustrated in FIG. 10, the process 280 is divided into two stages: a POS tagging stage 286 and a parse stage 288. The POS tagging stage 286 begins with the structure subsystem 172 performing (block 290) POS tagging of the utterance 284 to generate a set 292 of potential POS taggings, as well as corresponding confidence scores 294 for each potential POS tagging. In addition to the utterance 284, the POS plug-in 268 also receives a POS threshold value. For example, the POS plug-in 268 may be provided with a POS threshold value 296 that is representative of a particular confidence level (e.g., 80%), and as such, the set 292 of potential POS taggings will only include taggings having a corresponding confidence score that is greater than or equal to the POS threshold value 296. In other embodiments, the POS plug-in 268 may additionally or alternatively receive a POS tagging limit value (e.g., 10), and as such, the number of potential POS taggings generated by the POS plug-in 268 will be limited to the POS tagging limit value. It may be noted that, in certain situations, the set 292 of potential POS taggings may include only a single POS tagging.

For the embodiment illustrated in FIG. 10, the process 280 continues with the structure subsystem 172 using the correction plug-in 270 to perform auto-correction (block 298) of the set 292 of potential POS taggings to generate a corrected set 300 of potential POS taggings. For example, as mentioned, the POS plug-in 268 may include a ML-based component. As such, the POS plug-in 268 may be subject to inadvertently learning incorrect POS tagging during training, for example, as a result of defective training data. Therefore, the correction plug-in 270 is designed to modify or remove potential POS taggings from the set 292 to block defective POS taggings from being carried forward to the remaining steps of the process 280. In certain embodiments, the correction plug-in 270 may consult an external lexical database (e.g., stored in the database 106, stored as part of the understanding model 157) to ensure that token-surface forms (e.g., word-surface forms) match the selected POS tag for that token. It may be appreciated that this type of correction can be especially effective when the POS plug-in 268 is trained based on sub-word learning models (e.g., character-embedding-based models, morphemic models, etc.). In other embodiments, the correction plug-in 270 may include a ML-based component (e.g., an artificial neural network) that is trained to associate certain tokens with certain POS tags. For such embodiments, the correction plug-in 270 may determine a tagging score for each tag of a potential POS tagging in the set 292, and eliminate all potential POS taggings having a tagging score that is below a predetermined tagging threshold value (e.g., stored in the database 106).

For example, in certain embodiments, the correction plug-in 270 may implement a rules-based correction technique. For such embodiments, the correction plug-in 270 may access and apply rules 114 defined by a developer and stored in the database 106 to correct the set 292 of potential POS taggings. For example, the ML-based component of the POS plug-in 268 may mistakenly learn during training that the token "stop" denotes punctuation and not a verb or noun. As such, the developer may define one or more rules 114 to be applied by the correction plug-in 270 to either remove potential POS taggings from the set 292 that include this incorrect POS tagging, or to modify potential POS taggings from the set 292 to replace the erroneous POS tagging with a correct POS tagging. In certain embodiments, the correction plug-in 270 may instead use a combination of these techniques to eliminate or modify entries in the set 292 of potential POS taggings.

For the embodiment illustrated in FIG. 10, the POS tagging stage 286 of the process 280 concludes with the structure subsystem 172 using the VF plug-in 272 to perform variability filtering (block 302) of the corrected set 300 of potential POS taggings to generate a final nominee set 306 of potential POS taggings. In addition to the corrected set 300 of potential POS taggings, the VF plug-in 272 also receives a variation threshold value 304, which defines how different the potential POS taggings in the corrected set 300 should be from one another. The purpose of variability filtering is to improve the efficiency of the process 280, as well as the subsequent meaning search, by eliminating potential POS taggings that are considered too similar to other potential POS taggings in the corrected set 300 and, therefore, do not represent a sufficiently distinct path to warrant the computing resource expenditure to pursue.

Variability filtering can be accomplished in a number of different ways. In general, a tagging distance or variability function is used to determine how different two potential POS taggings in the corrected set 300 are from one another. Variability filtering blocks or prevents a meaning search from consuming additional computing resources to explore "shallow" differences between potential POS taggings that lead to meaning representations with only minimal and/or cosmetic differences. For example, a variability score may be calculated for any two entries in the corrected set 300 of potential POS taggings, and when the variability score is below the variation threshold 304, then one of the potential POS taggings is considered sufficiently redundant and is not included in the final nominee set 306 of potential POS taggings. As such, when the number of potential POS taggings is relatively small (e.g., 10 or less), then each potential POS tagging in the corrected set 300 may be compared in this manner. However, for embodiments in which a larger number of potential POS taggings are present in the corrected set 300 of POS taggings, then clustering techniques may be applied. For example, a tagging distance function may be used to determine a tagging distance between the potential POS taggings such that they can be clustered into groups (e.g., by maximizing distance between clusters, by forming a predefined number of clusters) based on these tagging distances. Subsequently, a representative potential POS tagging is selected from each group (e.g., the centroid potential POS tagging of each cluster) and advances to the next step in the process 280. It may be appreciated that other variability filtering techniques may be used, in accordance with the present disclosure.

In one example with a relatively small corrected set 300 of POS taggings, the VF plug-in 272 may use a diversity-based inclusion technique. For this example, the utterance 284 may be, "Change my password." In block 290, the POS plug-in 268 may determine the set 292 of potential POS taggings indicating that the tokens of the utterance 284 are, in order: (1) a command form of a verb, an adjective, and a noun; or (2) a verb, an adjective, and a noun; or (3) a noun, an adjective, and a noun; or (4) a verb, a pronoun, and a noun. After correction in block 298, the VF plug-in 272 receives the corrected set 300 of potential POS taggings and applies a variability function to determine how different the potential POS taggings are from one another. For this example, the VF plug-in 272 begins by considering the first entry in the corrected set 300 of potential POS taggings. The VF plug-in 272 determines that, since there is no basis for comparison, the first entry is sufficiently different and should be included in the final nominee set 306 of potential POS taggings. Next, the VF plug-in 272 may consider the second entry in the corrected set 300 of potential POS taggings by comparing it to the first entry using the variability function. An example variability function may be a weighted average. For this example, when the first and second entries are compared, the first tag (e.g., command form of verb) of the first entry and the first tag (e.g., verb) of the second entry are compared. Difference values for different tag comparisons may be stored as part of the rules 114 in the database 106. For example, the difference value assigned to a verb-verb comparison, a noun-noun comparison, an adjective-adjective, etc., may be zero; the difference value assigned to a command form verb-verb comparison may be slightly greater than zero (e.g., 0.1); the difference value assigned to a verb-noun comparison, a verb-adjective, a noun-adjective, etc., may be one, and so forth, within the database 106. In certain embodiments, the database 106 may further store weighting values for different POS tags, such that certain POS tags (e.g., verbs) have a greater contribution to the output of the variability function than other POS tags (e.g., nouns, pronouns). For this example, the weights of the POS tags are equivalent. As such, the variability function may calculate a variability score between the first and second entries (e.g., (0.1 for the difference between first tags+0 for the difference between the second tags+0 for the difference between the third tags)/(3 tags compared)=0.03), and then compare this variability score to the variation threshold value 304 (e.g., 0.3). Since the variability score is below the variation threshold value 304, the second entry is not included in the final nominee set 306 of POS taggings. This process continues with the third entry in the corrected set 300 of potential POS taggings being compared to the first entry (e.g., (1 for the difference between first tags+0 for the difference between the second tags+0 for the difference between the third tags)/(3 tags compared)=0.3, which is at the variation threshold value of 0.3), and the third entry is included in the final nominee set 306 of potential POS taggings. Subsequently, the fourth entry in the corrected set 300 of potential POS taggings is compared to the first entry (e.g., (0.1 for the difference between first tags+1 for the difference between the second tags+0 for the difference between the third tags)/(3 tags compared)=0.33, which is greater than the variation threshold value of 0.3), and also compared to the third entry (e.g., (1 for the difference between first tags+1 for the difference between the second tags+0 for the difference between the third tags)/(3 tags compared)=0.66, which is greater than the variation threshold value of 0.3), and is also included in the final nominee set 306 of potential POS taggings that are carried forward in the process 280.

For the embodiment illustrated in FIG. 10, the parse stage 288 begins with the structure subsystem 172 performing (block 308) parse inference using the parser plug-in 274 to generate a set 310 of potential meaning representations from the final nominee set 306 of potential POS taggings, as well as a corresponding confidence score 312 for the parsing of each potential meaning representation in the set 360. In addition to the final nominee set 306 of potential POS taggings, the POS plug-in 268 also receives a parse threshold value 314 that may be stored in the database 106. For example, the parser plug-in 274 may be provided with a parse threshold value 314 that is representative of a particular confidence level (e.g., 80%), and as such, the set 310 of potential meaning representations will only include meaning representations having a corresponding confidence score that is greater than or equal to the parse threshold value 314. It may be noted that, in certain cases, the parser plug-in 274 may not be able to generate a meaning representation for certain potential POS taggings.

In certain embodiments, it may be appreciated that the process 280 may include a second auto-correction step (block 315) to modify or remove entries in the set 310 of potential meaning representations before final scoring and filtering is performed. For example, as mentioned, the parser plug-in 274 may include a ML-based component. As such, the parser plug-in 274 may be subject to inadvertently learning incorrect parse tree structure generation during training, for example, as a result of defective training data. Therefore, in certain embodiments, the structure subsystem 172 may include a parser correction plug-in designed to modify or remove potential meaning representations from the set 310 to block defective meaning representations from being carried forward to the remaining steps of the process 280. In certain embodiments, this parser correction plug-in may include a ML-based component (e.g., an artificial neural network) that is trained to associate certain POS taggings with certain parse tree structures. In other embodiments, the parser correction plug-in may implement a rules-based correction technique, or a combination of rules-based and ML-based techniques, as discussed for the correction plug-in 270.

For the embodiment illustrated in FIG. 10, the parse stage 288 of the process 280 concludes with the structure subsystem 172 using the FSF plug-in 276 to perform final scoring and filtering (block 316) of the set 310 of potential meaning representations generated by the parser plug-in 274 in block 308. For example, as illustrated in FIG. 10, in certain embodiments, the FSF plug-in 276 receives the set 310 of potential meaning representations generated by the parser plug-in 274, the corresponding confidence scores 312 for each of the potential meaning representations, and the corresponding confidence scores 294 for the potential POS taggings used to generate the set 310 of potential meaning representations. In addition, the FSF plug-in 276 also receives a FSF threshold value 318, which may be stored in the database 106. The FSF plug-in 276 defines a final scoring function that calculates a final (e.g., overall, cumulative) score for each entry in the set 310 of potential meaning representations based on these confidence values, and only advances meaning representations having a final score that is at or above the FSF threshold value 318.

In different embodiments, the final scoring function of the FSF plug-in 276 may combine the confidence scores 294 from POS tagging and the confidence score 312 from parsing in different manners. For example, in certain embodiments, the final scoring function may multiply and/or sum the confidence score 294 and the confidence score 312. In certain embodiments, this multiplication and/or summation process may be weighted to increase the impact of the confidence scores 294 from POS tagging or the confidence scores 312 from parsing to the final scores. By way of specific example, in an embodiment, the corresponding final score of a meaning representation in the set 310 of potential meaning representations may be the five times the confidence score 294 from POS tagging plus the confidence score 312 from parsing. In other embodiments, the confidence scores 294 and 312 may be combined as a weighted average, wherein the relative weights for each confidence score may be predefined within the database 106.

Figure 11:
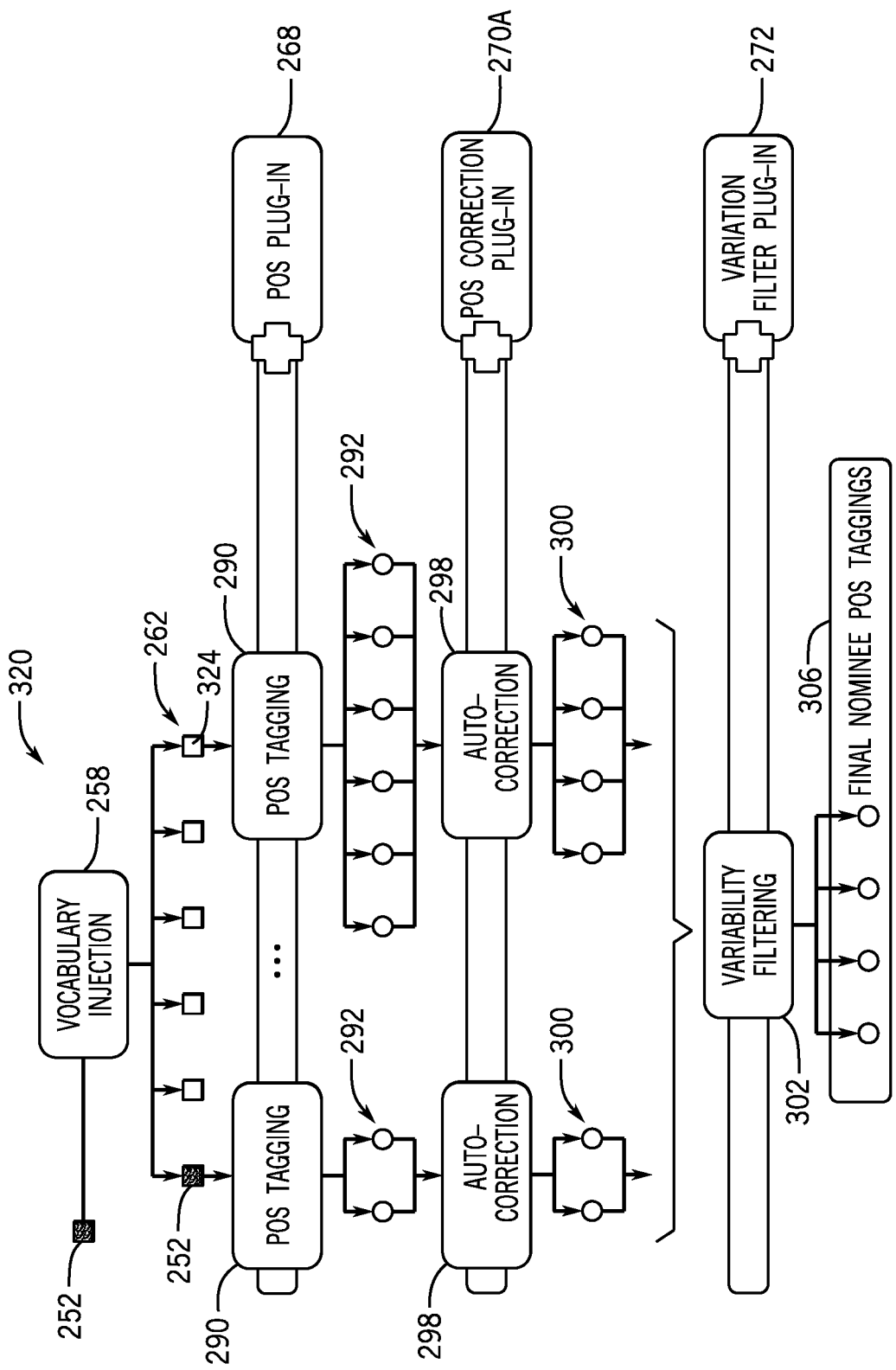
FIG. 11 is a flow diagram illustrating an embodiment of a process whereby an original utterance is re-expressed by the vocabulary subsystem and the structure subsystem into a set of final nominee POS taggings, in accordance with aspects of the present technique.

FIG. 11 is a flow diagram illustrating an embodiment of a process 302 whereby the original utterance 252 is re-expressed by the vocabulary subsystem 170 and the structure subsystem 172 into the set 306 of final nominee POS taggings, as discussed above with respect to FIGS. 9 and 10. As set forth above, the original utterance 252, which may be a received user utterance 122 or one of the sample utterances 155 of the intent-entity model 108, is provided to the vocabulary subsystem 170 for vocabulary injection 258. In certain embodiments, the original utterance 252 may first undergo a cleansing step prior to vocabulary injection 258. As a result of vocabulary injection 258, the set 262 of utterances is generated that includes the original utterance 252 and additional utterances (e.g., utterance 324) that are re-expressions of the original utterance 252 having alternative phraseology and/or terminology.

Continuing through the embodiment illustrated in FIG. 11, each utterance of the set 262 of utterances is provided to the POS plug-in 268 for POS tagging 290 to generate sets 292 of potential POS taggings for each utterance. As illustrated, the POS plug-in 268 may generate zero, one, or a plurality of POS taggings for each utterance of the set 262 of utterances. Subsequently, each of the potential POS taggings of the set 292 of potential POS taggings is provided to the POS correction plug-in 270A for auto-correction 298. For this example, during auto-correction 298, the POS correction plug-in 270A removes certain potential POS taggings from the set 292 of potential POS taggings that are known to be erroneous to generate the corrected sets 300 of potential POS taggings.

Continuing through the embodiment illustrated in FIG. 11, after auto-correction 298, the sets 292 of potential POS taggings are provided to the VF plug-in 272 for variability filtering 302. As indicated by the bracket 322, the VF plug-in 272 compares the potential POS taggings across all corrected sets 300 of potential POS taggings. This design is based on the present recognition that a potential POS tagging generated for a first utterance (e.g., the original utterance 252) may be substantially similar to the potential POS tagging generated for a second utterance 324 of the set 262 of utterances. As such, it may be appreciated that, in certain embodiments, the VF plug-in 272 applies a variability or tagging distance function, as discussed above, to remove potential POS taggings across all corrected sets 300 of potential POS taggings, generating the set 306 of final nominee POS taggings.

Figure 12:
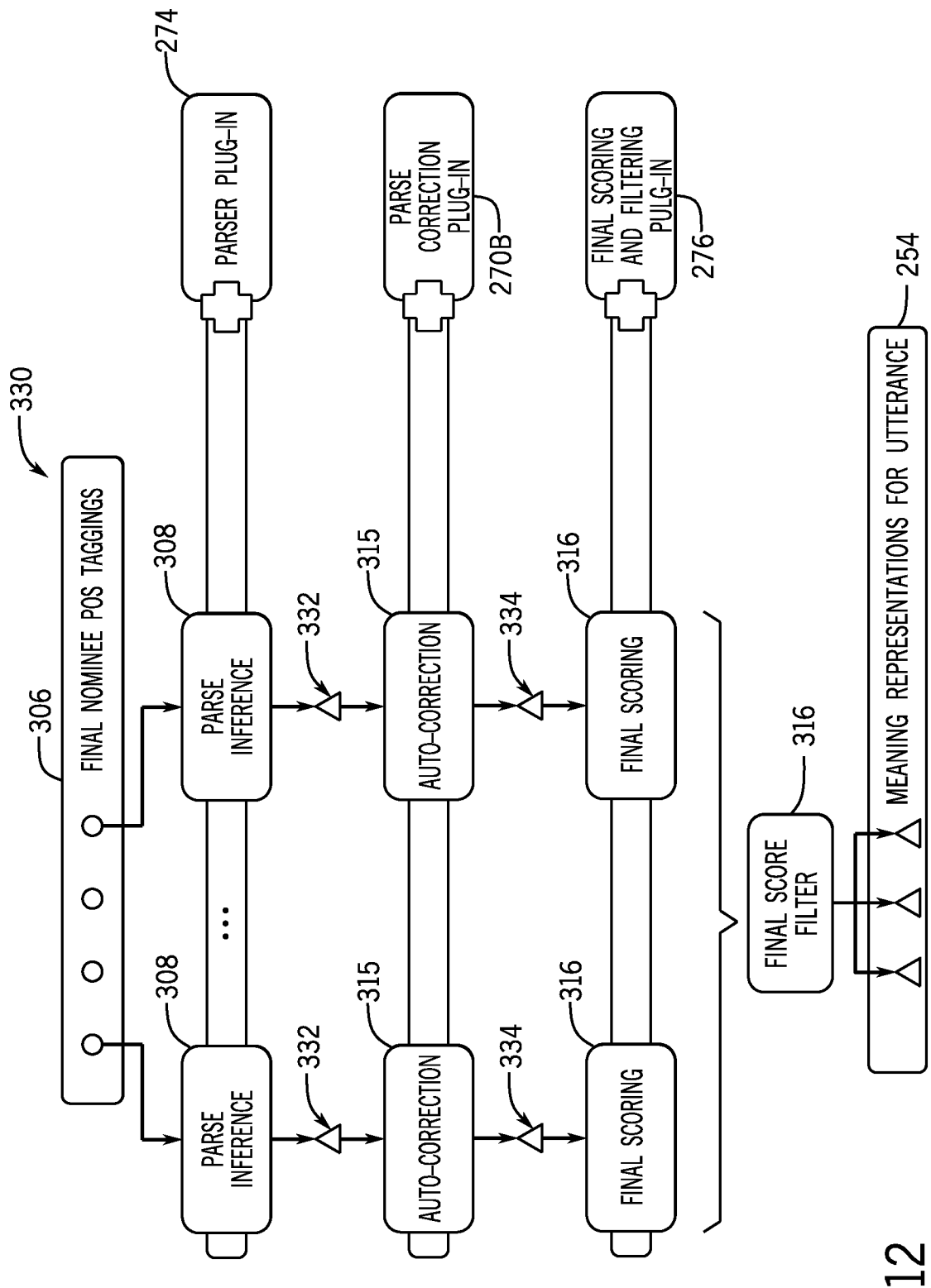
FIG. 12 is a flow diagram illustrating an embodiment of a process whereby the set of final nominee POS taggings generated in FIG. 11 is transformed by the structure subsystem into a set of meaning representations of the original utterance, in accordance with aspects of the present technique.

FIG. 12 is a flow diagram illustrating an embodiment of a process 330 whereby the set 306 of final nominee POS taggings generated by the process 320 of FIG. 11 is transformed into the set 254 of meaning representations of the original utterance 252 by the structure subsystem 172, as discussed above with respect to FIG. 10. Each entry in the set 306 of final nominee POS taggings is provided to the parser plug-in 274 for parse inference 308, and the parser plug-in 274 generates a respective potential meaning representation 332 for each entry in the set 306. Subsequently, each of the meaning representations 332 is provided to the parse correction plug-in 270B for auto-correction 315. For this example, during parse auto-correction 315, the parse correction plug-in 270B modifies or removes certain potential meaning representations 332 that are known to be erroneous to generate the corrected potential meaning representations 334. For example, during the parse auto-correction 315, the parse correction plug-in 270B may detect incorrect node-node parse links (e.g., a direct object node erroneously linking to a subject node), incorrect node POS/link type combinations (e.g., a direct object link type pointing to a node that is POS-tagged to be a verb), and so forth, in the potential meaning representations 332 and remove or modify these incorrect structures, as reflected by the corrected potential meaning representations 334.

As discussed, each potential meaning representation 334 is provided to the FSF plug-in 276, along with the corresponding confidence scores determined by the parser plug-in 274 during the parse inference 308, as well as the corresponding confidence scores determined by the POS plug-in 268 during the POS tagging 290, for each potential meaning representation 334. The FSF plug-in 276 combines these confidence scores, as discussed above, to determine a respective final score for each potential meaning representations 334. Then, the FSF plug-in 276 performs a final score filter operation 316, in which each potential meaning representation 334 having a final score below the FSF threshold 318 is not included in the final set 254 of meaning representations. As such, the final output is a set 254 of meaning representations that are representative of the original utterance 252. As noted above, whether the original utterance 252 is a received user utterance 122 or a sample utterance 155 of the intent-entity model 108, since the final set 254 of meaning representations include multiple re-expressions and forms of the original utterance 252, the chances of locating a match during the meaning search (intent inference) is improved. Additionally, since potentially erroneous and substantially redundant forms of the original utterance 252 are removed from consideration when generating the final set 254 of meaning representations, these forms are not incorporated into the meaning search, improving the efficiency of the meaning search and the operation of the NLU framework.

Technical effects of the present disclosure include providing an agent automation framework that is capable of extracting meaning from user utterances, such as requests received by a virtual agent (e.g., a chat agent), and suitably responding to these user utterances. Additionally, present embodiment provide an NLU framework having a structure subsystem capable of detecting multiple alternative meaning representations (e.g., utterance trees) for a given natural language utterance. The disclosed structure subsystem generates these multiple meaning representations by applying a series of refinements on the results of ML-based and rules-based techniques that detect different facets of an utterance's form or shape. The disclosed structure subsystem enables improved intent inference of natural language requests by considering as multiple probable form-derivations that should be given due consideration during the meaning search, while effectively pruning erroneous or effectively redundant form-derivations from consideration. As such, the disclosed structure subsystem improves the performance, the domain specificity, and/or the efficiency of the NLU framework.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An agent automation system, comprising:
 a memory configured to store a natural language understanding (NLU) framework, wherein the NLU framework includes a part-of-speech (POS) component, a variability filter component, a parser component, and a final scoring and filtering component; and
 a processor configured to execute instructions of the NLU framework to cause the agent automation system to perform actions comprising:

performing, via the POS component, part-of-speech (POS) tagging to generate a set of potential POS taggings for a set of utterances;

performing, via the variability filter component, variability filtering of the set of potential POS taggings to generate a set of final nominee POS taggings, wherein each of the set of final nominee POS taggings is distinct from one another;

parsing, via the parsing component, the set of final nominee POS taggings to generate a set of potential meaning representations for the set of final nominee POS taggings; and selecting, via the final scoring and filtering component, a final set of meaning representations for the set of utterances from the set of potential meaning representations.

2. The agent automation system of claim 1, wherein the NLU framework includes a vocabulary subsystem, and wherein the processor is configured to execute the instructions of the NLU framework to cause the agent automation system to perform actions comprising:

performing, via the vocabulary subsystem, vocabulary injection to generate the set of utterances based on an original utterance, wherein the set of utterances includes the original utterance and one or more re-expressions of the original utterance having different phraseology, different terminology, or a combination thereof.

3. The agent automation system of claim 2, wherein the original utterance is a user utterance, and wherein the final set of meaning representations forms part of an utterance meaning model that defines a search key for a meaning search.

4. The agent automation system of claim 2, wherein the original utterance is a sample utterance of an intent-entity model stored in the memory, and wherein the final set of meaning representations forms part of an understanding model that defines a search space for a meaning search.

5. The agent automation system of claim 1, wherein the POS component, the variability filter component, the parser component, and the final scoring and filtering component are each implemented as plug-ins of the NLU framework.

6. The agent automation system of claim 1, wherein the POS component, the parser component, or a combination thereof, is implemented as a machine-learning (ML)-based component that includes an artificial neural network.

7. The agent automation system of claim 1, wherein, to perform POS tagging, the processor is configured to execute the instructions of the NLU framework to cause the agent automation system to perform actions comprising:

for each utterance of the set of utterances:
generating at least one potential POS tagging of the utterance;
determining a respective confidence score for the at least one potential POS tagging; and
selecting the at least one potential POS tagging for inclusion in the set of potential POS taggings in response to determining that the respective confidence score is greater than or equal to a predefined POS threshold value.

8. The agent automation system of claim 1, wherein, to perform variability filtering, the processor is configured to execute the instructions of the NLU framework to cause the agent automation system to perform actions comprising:

calculating a variability score between a first potential POS tagging and a second potential POS tagging of the set of potential POS taggings; and in response to the variability score being less than a predefined variation threshold value, selecting only one of the first potential POS tagging and the second potential POS tagging for inclusion in the set of final nominee POS taggings.

9. The agent automation system of claim 1, wherein, to perform variability filtering, the processor is configured to execute the instructions of the NLU framework to cause the agent automation system to perform actions comprising:

calculating a tagging distance between each potential POS tagging of the set of potential POS taggings;
clustering the set of potential POS taggings into groups of potential POS taggings based on the tagging distance and a predefined variation threshold value; and
selecting a representative potential POS tagging for each of the groups of potential POS taggings for inclusion in the set of final nominee POS taggings.

10. The agent automation system of claim 1, wherein, to parse the set of final nominee POS taggings, the processor is configured to execute the instructions of the NLU framework to cause the agent automation system to perform actions comprising:

for each POS tagging of the set of final nominee POS taggings:
generating at least one potential meaning representation based on the POS tagging;
determining a respective confidence score for the at least one potential meaning representation; and
selecting the at least one potential meaning representation for inclusion in the set of potential meaning representations in response to determining that the respective confidence score is greater than or equal to a predefined parse threshold value.

11. The agent automation system of claim 1, wherein, to select the final set of meaning representations, the processor is configured to execute the instructions of the NLU framework to cause the agent automation system to perform actions comprising:

for each potential meaning representation of the set of potential meaning representations:
combining a POS tagging confidence score and a parsing confidence score associated with the potential meaning representation to calculate a respective final score of the potential meaning representation; and
selecting the potential meaning representation for inclusion in the final set of meaning representations in response to determining that the respective final score of the potential meaning representation is greater than or equal to a final scoring and filtering threshold value.

12. A method of operating a natural language understanding (NLU) framework, comprising:

performing part-of-speech (POS) tagging to generate a set of potential POS taggings for a set of utterances;
performing variability filtering of the set of potential POS taggings to generate a set of final nominee POS taggings, wherein each of the set of final nominee POS taggings is distinct from one another;
parsing the set of final nominee POS taggings to generate a set of potential meaning representations for the set of final nominee POS taggings; and
selecting a final set of meaning representations for the set of utterances from the set of potential meaning representations.

13. The method of claim 12, wherein each potential meaning representation of the set of potential meaning representations is a tree data structure that includes:
- a particular potential POS tagging from the set of potential POS taggings that was generated for a particular utterance of the set of utterance; and
- at least one vector representing a semantic meaning of at least one portion of the particular utterance.

14. The method of claim 12, comprising:
before performing POS tagging, performing vocabulary injection to generate the set of utterances based on an original utterance by:
- identifying one or more tokens of the original utterance that are present in a vocabulary model;
- selecting one or more alternative tokens from the vocabulary model for the one or more tokens; and
- generating one or more re-expressions of the original utterance, wherein the one or more re-expressions have at least a portion of the one or more tokens of the original utterance replaced with the one or more alternative tokens; and
- selecting the original utterance and the one or more re-expressions of the original utterance for inclusion in the set of utterances.

15. The method of claim 12, wherein performing part-of-speech (POS) tagging comprises:
for each utterance of the set of utterances:
- generating at least one potential POS tagging of the utterance;
- determining a respective confidence score for the at least one potential POS tagging; and
- selecting the at least one potential POS tagging for inclusion in the set of potential POS taggings in response to determining that the respective confidence score is greater than or equal to a predefined POS threshold value.

16. The method of claim 12, wherein performing variability filtering comprises:
- calculating a variability score between two potential POS taggings of the set of potential POS taggings; and
- in response to the variability score being less than a predefined variation threshold value, selecting only one of the two potential POS taggings for inclusion in the set of final nominee POS taggings.

17. The method of claim 12, comprising:
calculating a respective final score for each potential meaning representation in the set of potential meaning representations, wherein the final set of meaning representations is selected based on the respective final score of each potential meaning representation.

18. The method of claim 17, wherein calculating the respective final score and selecting the final set of meaning representations comprises:
for each potential meaning representation of the set of potential meaning representations:
- combining a POS tagging confidence score and a parsing confidence score of the potential meaning representation to calculate the respective final score for the potential meaning representation; and
- selecting the potential meaning representation for inclusion in the final set of meaning representations in response to determining that the respective final score is greater than or equal to a predefined final scoring and filtering threshold value.

19. The method of claim 12, performing a meaning search using the final set of meaning representations, wherein the final set of meaning representations forms part of an utterance meaning model that defines a search key of the meaning search or forms part of an understanding model that defines a search space for the meaning search.

20. A non-transitory, computer-readable medium storing instructions of a natural language understanding (NLU) framework executable by one or more processors of a computing system, the instructions comprising instructions to:
- perform part-of-speech (POS) tagging of a set of utterances to generate a set of potential POS taggings for a set of utterances;
- perform variability filtering of the set of potential POS taggings to generate a set of final nominee POS taggings, wherein each of the set of final nominee POS taggings is distinct from one another;
- parse the set of final nominee POS taggings to generate a set of potential meaning representations for the set of final nominee POS taggings;
- calculate a respective final score for each potential meaning representation in the set of potential meaning representations; and
- select a final set of meaning representations for the set of utterances from the set of potential meaning representations based on the respective final score of each potential meaning representation in the set of potential meaning representations.

* * * * *